(12) United States Patent
Gu et al.

(10) Patent No.: US 11,220,449 B2
(45) Date of Patent: Jan. 11, 2022

(54) INTEGRATED DEAMMONIFICATION PROCESS FOR WASTEWATER RECLAMATION

(71) Applicant: Nanyang Technological University, Singapore (SG)

(72) Inventors: Jun Gu, Singapore (SG); Yu Liu, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 16/862,481

(22) Filed: Apr. 29, 2020

(65) Prior Publication Data
US 2020/0392028 A1    Dec. 17, 2020

(30) Foreign Application Priority Data
Apr. 29, 2019   (SG) .......................... 10201903859Q

(51) Int. Cl.
*C02F 9/00*     (2006.01)
*B01D 19/00*    (2006.01)
(Continued)

(52) U.S. Cl.
CPC ............ *C02F 9/00* (2013.01); *B01D 19/0036* (2013.01); *C02F 1/20* (2013.01); *C02F 1/441* (2013.01);
(Continued)

(58) Field of Classification Search
CPC ...... C02F 9/00; C02F 3/303; C02F 2301/046; C02F 3/2806; C02F 11/04; C02F 1/441;
(Continued)

(56) References Cited

U.S. PATENT DOCUMENTS 9,670,083 B2 *    6/2017  Wett ........................ C02F 3/308
2005/0194310 A1 * 9/2005  Yamamoto ............ C02F 3/1268
                                                            210/605

(Continued)

OTHER PUBLICATIONS

Ge et al., "Complete nitrogen removal from municipal wastewater via partial nitrification by appropriately alternating anoxic/aerobic conditions in a continuous plug-flow step feed process," *Water Research* 55:95-105, 2014.

(Continued)

*Primary Examiner* — Fred Prince
(74) *Attorney, Agent, or Firm* — Seed IP Law Group LLP

(57) ABSTRACT

A deammonification system 100 and process for treating wastewater are disclosed herein. The system and process may involve an anaerobic reactor 204 operable to produce biogas 2 from organic carbon in the wastewater 1, and a deammonification unit including (i) one or more anoxic chambers 302 in fluid communication with the anaerobic reactor 204, wherein each of the one or more anoxic chambers 302 houses a plurality of biocarriers 306, wherein each of the plurality of biocarriers 306 includes a biofilm of anaerobic ammonium oxidation bacteria, and (ii) one or more oxic chambers 304 operable to produce nitrite from ammonia and/or ammonium, wherein the wastewater processed in an anoxic chamber 302 of the one or more anoxic chambers 302 is channeled to an oxic chamber 304 of the one or more oxic chambers 304 which is adjacent to and downstream of the anoxic chamber 302.

18 Claims, 12 Drawing Sheets
Specification includes a Sequence Listing.

(51) Int. Cl.
*C02F 3/30* (2006.01)
*C02F 3/28* (2006.01)
*C02F 11/04* (2006.01)
*C02F 1/44* (2006.01)
*C02F 1/20* (2006.01)

(52) U.S. Cl.
CPC .............. *C02F 1/444* (2013.01); *C02F 3/28* (2013.01); *C02F 3/2806* (2013.01); *C02F 3/2853* (2013.01); *C02F 3/303* (2013.01); *C02F 3/307* (2013.01); *C02F 11/04* (2013.01); *C02F 2301/046* (2013.01); *Y02E 50/30* (2013.01); *Y02W 10/20* (2015.05)

(58) Field of Classification Search
CPC .......... C02F 1/20; C02F 1/444; C02F 3/2853; C02F 3/28; C02F 3/307; B01D 19/0036; Y02E 50/30; Y02W 10/20
USPC ................. 210/605, 615, 616, 617, 903, 259
See application file for complete search history.

(56) References Cited

U.S. PATENT DOCUMENTS

| | | | |
|---|---|---|---|
| 2013/0213883 A1* | 8/2013 | Josse | C02F 11/04 210/630 |
| 2014/0069864 A1* | 3/2014 | Wett | C02F 3/006 210/605 |
| 2014/0263041 A1* | 9/2014 | Regmi | C02F 3/006 210/605 |
| 2015/0368131 A1* | 12/2015 | Garrido Fernandez | C12M 27/02 210/605 |
| 2017/0291839 A1* | 10/2017 | Christensson | C02F 3/08 |

OTHER PUBLICATIONS

Gu et al., "An integrated AMBBR and IFAS-SBR process for municipal wastewater treatment towards enhanced energy recovery, reduced energy consumption and sludge production." *Water Research* 110:262-269, 2017.

Gu, "Novel A-B processes for energy-efficient municipal wastewater reclamation with minimized sludge production," PhD Thesis, Nanyang Technological University, Singapore, 141 pages, 2018.

Wan et al., "COD capture: a feasible option towards energy self-sufficient domestic wastewater treatment," *Scientific Reports* 6:25054, 2016 (9 pages).

Xu et al., "The challenges of mainstream deammonification process for municipal used water treatment," *Appl. Microbiol. Biotechnol.* 99:2485-2490, 2015.

Zhu et al. ., "Performance and optimization of biological nitrogen removal process enhanced by anoxic/oxic step feeding," *Biochemical Engineering Journal* 43:280-287, 2009.

* cited by examiner

FIG. 2

| Primer | Gene | Target | Sequence (5'-3') | Annealing Temp. (°C) |
|---|---|---|---|---|
| CTO189f CTO654r | 16S rRNA | β-Subdivision AOB | CTAGCYTTGTAGTTTCAAACGC | 57 |
| FGPS872 FGPS1269 | 16S rRNA | Nitrobacter | CTAAAACTCAAAGGAATTGA TTTTTGAGATTTGCTAG | 50 |
| NSR1113f NSR1264r | 16S rRNA | Nitrospira | CCTGCTTTCAGTTGCTACCG GTTTGCAGCGCTTTGTACCG | 65 |
| 341f 518r | 16S rRNA | Universal | CCTACGGGAGGCAGCAG ATTACCGCGGCTGCTGG | 55 |
| A438f A684r | 16S rRNA | Anammox | GTCRGGAGTTADGAAATG ACCAGAAGTTCCACTCTC | 55 |

| Days | Suspended sludge (copies/g VSS) | | | |
|---|---|---|---|---|
| | AOB | *Nitrospira* | *Nitrobacter* | AOB/NOB |
| 1 | $3.47 \times 10^{10}$ | $1.19 \times 10^{11}$ | $1.36 \times 10^{9}$ | 0.29 |
| 80 | $2.75 \times 10^{11}$ | $1.79 \times 10^{11}$ | $6.46 \times 10^{8}$ | 1.53 |
| 110 | $2.83 \times 10^{11}$ | $2.98 \times 10^{11}$ | $3.33 \times 10^{8}$ | 0.95 |

| Time (day) | $SOUR_{AOB}$, g $O_2$/(gVSS·d) | $SOUR_{NOB}$, g $O_2$/(gVSS·d) | $SOUR_H$, g $O_2$/(gVSS·d) |
|---|---|---|---|
| 76 | 1.06 | 0.12 | 0 |
| 107 | 1.09 | 0.23 | 0.0024 |

INTEGRATED DEAMMONIFICATION PROCESS FOR WASTEWATER RECLAMATION

CROSS-REFERENCE TO RELATED APPLICATION

This application claims the benefit of priority of Singapore Patent Application No. 10201903859Q, filed 29 Apr. 2019, the content of it being hereby incorporated by reference in its entirety for all purposes.

STATEMENT REGARDING SEQUENCE LISTING

The Sequence Listing associated with this application is provided in text format in lieu of a paper copy, and is hereby incorporated by reference into the specification. The name of the text file containing the Sequence Listing is 690148_570_SEQUENCE_LISTING.txt. The text file is 2.2 KB, was created on Aug. 6, 2020, and is being submitted electronically via EFS-Web.

TECHNICAL FIELD

The present disclosure relates to a deammonification system for treating wastewater. The present disclosure also relates to a deammonification process for treating wastewater.

BACKGROUND

Conventional activated sludge (CAS) process is one of the treatment means widely applied for municipal wastewater treatment. However, concerns about its high energy consumption and significant excess sludge production impairs the long-term economic viability and environmental sustainability of CAS process. For example, CAS wastewater treatment takes up about 3% of the annual electrical energy consumed in USA, and about 30 million tons of sludge was produced in China in 2015.

Energy consumption in a CAS process tends to range from 0.3 to 0.6 kWh/m$^3$, 50% of which may be used for aeration and 30% for excess sludge treatment. Theoretically, the chemical energy available in domestic wastewater may be five times the energy used in a CAS process for wastewater treatment, which the CAS process may not effectively recover. As substantial improvement in energy efficiency and sludge reduction of a CAS process may have become considerably difficult or non-achievable even through further process optimization, there is a need to develop other configurations of wastewater treatment plants (WWTPs) having enhanced energy recovery from wastewater, less sludge production and lower energy consumption.

There is thus a need to provide for a solution that addresses one or more of the limitations mentioned above. The solution should at least provide for a system and a process both operable to treat wastewater.

SUMMARY

In a first aspect, there is provided for a deammonification system 100 for treating wastewater 1 including:
an anaerobic reactor 204 operable to produce biogas 2 from organic carbon in the wastewater 1; and
a deammonification unit including (i) one or more anoxic chambers 302 in fluid communication with the anaerobic reactor 204, wherein each of the one or more anoxic chambers 302 houses a plurality of biocarriers 306, wherein each of the plurality of biocarriers 306 includes a biofilm of anaerobic ammonium oxidation bacteria, and (ii) one or more oxic chambers 304 operable to produce nitrite from ammonia and/or ammonium, wherein the wastewater processed in an anoxic chamber 302 of the one or more anoxic chambers 302 is channeled to an oxic chamber 304 of the one or more oxic chambers 304 which is adjacent to and downstream of the anoxic chamber 302.

In another aspect, there is provided for a deammonification process for treating wastewater 1, the deammonification method including:
introducing the wastewater 1 to an anaerobic reactor 204 operable to produce a biogas 2 from organic carbon in the wastewater 1; and
treating the wastewater from the anaerobic reactor 204 in a deammonification unit, wherein the deammonification unit includes (i) one or more anoxic chambers 302 in fluid communication with the degasser 206, wherein each of the one or more anoxic chambers 302 houses a plurality of biocarriers 306, wherein each of the plurality of biocarriers 306 includes a biofilm of anaerobic ammonium oxidation bacteria, and (ii) one or more oxic chambers 304 operable to produce nitrite from ammonia and/or ammonium, wherein the wastewater processed in an anoxic chamber 302 of the one or more anoxic chambers 302 is channeled to an oxic chamber 304 of the one or more oxic chambers 304 which is adjacent to and downstream of the anoxic chamber 302.

BRIEF DESCRIPTION OF THE DRAWINGS

The drawings are not necessarily to scale, emphasis instead generally being placed upon illustrating the principles of the disclosure. In the following description, various aspects and embodiments of the present disclosure are described with reference to the following drawings, in which:

FIG. 2 is a table showing the primers (SEQ ID NOS: 3-11) used for quantitative polymerase chain reaction (PCR) analysis.

DETAILED DESCRIPTION

Figure 1A:
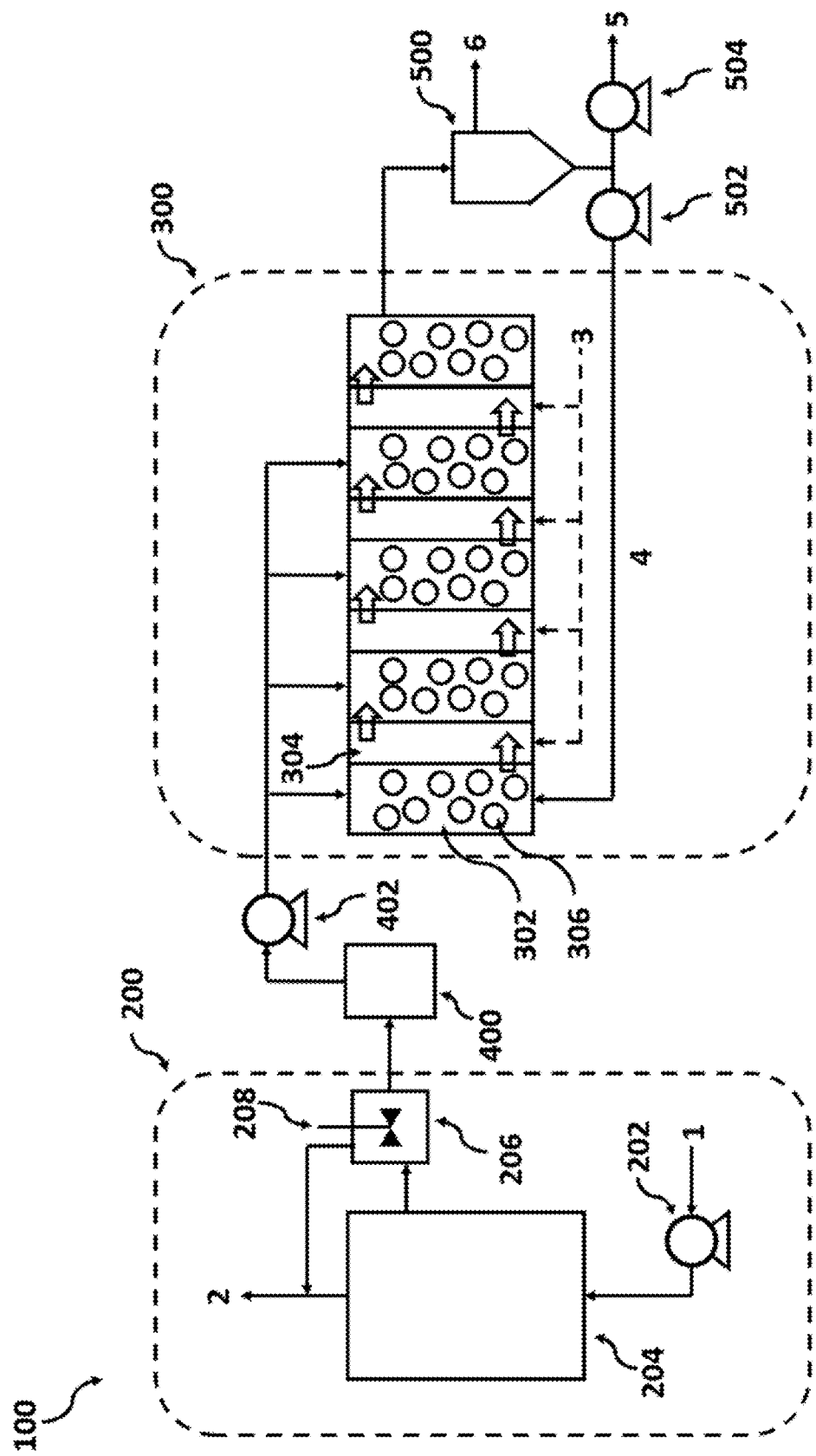
FIG. 1A is a schematic diagram of an A-B system 100 and process of the present disclosure, wherein A-B denotes the A stage 200 and B stage 300. The A stage 200 refers to an anaerobic treatment stage and B stage 300 refers to a deammonification stage. Stage A 200 includes an influent pump 202 operable to deliver influent 1 to an anaerobic reactor 204. The influent 1 may be any wastewater feed and the anaerobic reactor 204 may be an anaerobic fixed bed reactor (AFBR). The anaerobic reactor 204 is operable for direct chemical oxygen demand (COD—e.g. biomass, dissolved and gaseous carbon dioxide) capture and biogas production 2. The hydraulic retention time (HRT) of the AFBR may be controlled at, for example, 6.2 hrs and effluent from the AFBR may be introduced into a degasser 206 for further recovery of biogas not recovered in 2. The degasser 206 used may be, for example, a flash chamber. The biogas not recovered in 2 are those that remain dissolved in the effluent of the AFBR. The flash chamber may be a chamber that has an agitator (i.e. agitation means) 208 operable for recovery of dissolved biogas. One example of biogas may be methane. The recovered biogas from flash chamber may be channeled to 2. From the flash chamber, the wastewater is equally channeled into one or more anoxic chambers 302 of a step-feed reactor using a pump 402 via a buffer tank 400. The one or more anoxic chamber 302 may be labeled A1 to A5, wherein A1 is the most upstream anoxic chamber (labels A1 to A5 not shown in figure). Each anoxic chamber 302 may be packed with biocarriers 306 attached with anaerobic ammonium oxidation (anammox) bacteria with a specified packing ratio, for example, 50%. The volumetric ratio of an anoxic chamber 302 to an oxic chamber 304 may be, for example, 4:3. Wastewater treated in one anoxic chamber 302 is channeled into an oxic chamber 304 that is adjacent to and downstream of the anoxic chamber 302. For operation of oxic chambers 304, air 3 may be channeled into all the oxic chambers 304 to maintain dissolved oxygen concentration in each oxic chamber 304 at 1.2 to 1.5 mg/L. The biocarriers 306 may be gently agitated by, for example, nitrogen gas sparging and/or mechanical mixing. The agitation helps the biocarriers 306 confined in an anoxic chamber 302 to move around therein rather than have the biocarriers 306 settled at bottom of the anoxic chamber 302 or float on surface of wastewater, thereby creating sufficient contact between the biofilm on the biocarriers 306 and the wastewater. The whole system 100 may be operated at 30±1° C. For evaluation purposes, synthetic wastewater may be used. From the most downstream anoxic chamber 302, the wastewater may be fed to a clarifier 500, which the effluent 6 of the system 100 is recovered from. Excess sludge 5 from the clarifier 500 may be purged from the system 100 via a sludge pump 504 and/or recycled back to the most upstream anoxic chamber 302 via sludge recycle pump 502.

The following detailed description refers to the accompanying drawings that show, by way of illustration, specific details, aspects and embodiments in which the disclosure may be practiced.

Features that are described in the context of an aspect and/or embodiment may correspondingly be applicable to the same or similar features in the other aspects and/or embodiments. Features that are described in the context of an aspect and/or embodiment may correspondingly be applicable to the other aspects and/or embodiments, even if not explicitly described in these other aspects and/or embodiments. Furthermore, additions and/or combinations and/or alternatives as described for a feature in the context of an aspect and/or embodiment may correspondingly be applicable to the same or similar feature in the other aspects and/or embodiments.

The present disclosure relates to a deammonification system 100 and process operable for wastewater treatment.

The present system and process may involve anaerobic ammonia oxidizing (anammox) bacteria. Anammox bacteria has the capability to anaerobically oxidize ammonium to nitrogen gas with nitrite as the electron acceptor. Compared to processes involving conventional nitrification and denitrification, the anammox process is advantageous as an alternative for energy-efficient nitrogen removal from wastewater (e.g. municipal wastewater).

In addition, conventional deammonification tends to have several limitations, such as high COD/N ratio (chemical oxygen demand/nitrogen ratio), poor sustainable nitrite shunt, poor retention of anammox bacteria, etc. The present system 100 and process may address one or more of these limitations and may further significantly improve the energy recovery potential.

The present system 100 and process may be continuous and operated with two stages, e.g. A stage 200 and B stage 300. The A stage 200 advantageously provides for the significant improvement of energy recovery while B stage 300 markedly reduces energy consumption. Hence, the present system 100 and process not only increases the amount of energy recoverable from wastewater, but also consumes less energy for treatment of wastewater.

The present system 100 and process involves a deammonification process that may combine partial nitritation and anaerobic ammonium oxidation (anammox) as a viable option for energy efficient ammonia removal from high-strength wastewater, e.g. anaerobic digestion liquor. The present system 100 and process are operable to provide appropriate suppression of nitrite oxidizing bacteria (NOB) against ammonia oxidizing bacteria (AOB), and with effective retention of AOB and anammox bacteria. That is to say, NOB may detrimentally compete with (i) AOB over oxygen and (ii) anammox bacteria over nitrite, and the present system 100 and process is able to suppress presence of NOB. Further, the present system 100 and process does not require bioaugmentation. In other words, addition of AOB and/or anammox bacteria is not required during and/or after each operation.

Details of various aspects and embodiments of the present system 100 and process, and advantages associated with the various embodiments are now described below.

In various aspects and embodiments, there is provided a deammonification system 100 for treating wastewater. The term "deammonification" refers to a system and/or process that combines partial nitritation and anaerobic ammonia oxidation (anammox). Partial nitritation may involve oxidizing ammonia and/or ammonium to nitrite via ammonia oxidizing bacteria (AOB), which may be qualified by the equation (for ammonium species) $2NH_4^+ + 3O_2 \rightarrow 2NO_2^- + 4H^+ + 2H_2O$. Anaerobic ammonia oxidation may convert ammonia and/or ammonium to nitrogen, which may be qualified by the equation (for ammonium species) $NH_4^+ + NO_2^- \rightarrow N_2 + 2 H_2O$. The present system 100 may be interchangeably termed herein an A-B system as the present system 100 involves two stages, A stage 200 and B stage 300.

In the A stage 200, the present system 100 may include an anaerobic reactor 204 operable to produce biogas 2 from organic carbon in the wastewater 1. The wastewater 1 may be fed to the anaerobic reactor 204 as an influent 1 via influent pump 202. The wastewater 1 entering the anaerobic reactor 204 may, accordingly, be exchangeably termed herein as influent 1.

The present system 100 and process may optionally include a degasser 206 configured to receive wastewater from the anaerobic reactor 204, wherein the wastewater from the anaerobic reactor 204 may include the biogas dissolved therein, wherein the degasser is operable to recover the biogas dissolved in the wastewater from the anaerobic reactor 204.

In stage B 300, the present system 100 and process may include a deammonification unit including (i) one or more anoxic chambers 302 in fluid communication with the anaerobic reactor 204 and/or the degasser 206, wherein each of the one or more anoxic chambers 302 may house a plurality of biocarriers 306, wherein each of the plurality of biocarriers 306 may include a biofilm of anaerobic ammonium oxidation bacteria, and (ii) one or more oxic chambers 304 operable to produce nitrite from ammonia and/or ammonium, wherein the wastewater processed in an anoxic chamber 302 of the one or more anoxic chambers 302 is channeled to an oxic chamber 304 of the one or more oxic chambers 304 which is adjacent to and downstream of the anoxic chamber 302.

The anaerobic reactor 204 may be termed herein an anaerobic bioreactor. The anaerobic reactor 204 is operable to produce biogas from organic carbon in wastewater (e.g. municipal wastewater). The biogas may include methane, carbon dioxide, etc., and in various aspects, the biogas may include or may be methane. The anaerobic reactor 204 therefore recovers energy in the form of biogas (which tpically is not recovered in conventional CAS processes), thereby increasing energy efficiency for treating wastewater and reducing amount of sludge produced. To prevent build-up of biogas in the anaerobic reactor 204, the anaerobic reactor may include an outlet to discharge the biogas 2 produced in the anaerobic reactor 204.

In various aspects, the anaerobic reactor 204 may be, without being limited to, an anaerobic membrane bioreactor (AnMBR), an upflow anaerobic sludge blanket reactor (UASB), an expanded granular sludge bed reactor (EGSB), an anaerobic moving bed biofilm reactor (AMBBR), an anaerobic baffled reactor (ABR), upflow anaerobic fixed-bed reactor (UAFBR), or an anaerobic fixed bed reactor (AFBR). In various aspects, the anaerobic reactor 204 may be an AFBR, which may offer process control and stability.

Wastewater treated in the anaerobic reactor 204 may then be optionally channeled to a degasser 206 or directly to one or more anoxic chambers 302. Implementation of the degasser may be beneficial in mitigation of greenhouse gas emission and may be helpful for energy recovery depending on the COD concentration in the influent and dissolved biogas concentration in the effluent from the anaerobic reactor. The degasser 206 recovers biogas dissolved in the wastewater, i.e. biogas that are not recovered from the anaerobic reactor 204 in its gaseous form. The wastewater from the anaerobic reactor 204 may be termed herein an anaerobic effluent.

In various aspects, the degasser 206 may be or may include a flash chamber. The flash chamber of the present disclosure may be a chamber that has an agitation means 208 operable to recover dissolved biogas from wasterwater. The agitation means 208 provides energy for the dissolved biogas to become biogas that can migrate out of the wastewater and recovered from the degasser 206 in its gaseous form. The agitation means 208 may be any suitable mechanical mixing means for recovering dissolved biogas.

In various embodiments, the flash chamber is configurable to be in fluid communication with a buffer tank 400 arranged downstream of the flash chamber but upstream of the one or more anoxic chambers 302. The buffer tank 400 may be termed herein holding tank as it holds wastewater from the degasser 206, thereby controlling the amount of wastewater fed to the one or more anoxic chambers 302. Advantageously, the buffer tank 400 mitigates any safety issue arising from, for example, a surge in wastewater in the system 100. The buffer tank 400 also serves as a storage in case of peak loads, e.g. when there happens to be excess wastewater to be treated.

In various aspects, the degasser 206 may be or may include a mixing chamber 800 having or in fluid communication with one or more overflow weirs 804 arranged in a cascading manner, wherein the wastewater is channeled from the mixing chamber 800 to a cascade chamber 802 of the degasser 206. The cascade chamber 802 is operable to strip (i.e. remove) the biogas dissolved in the wastewater from the anaerobic reactor 204. Wastewater from the cascade chamber 802 may then to be channeled to the one or more anoxic chambers 302.

In various aspects, the wastewater fed to the one or more anoxic chambers 302, for example, from the anaerobic reactor 204 and/or the degasser 206, may have a COD/N ratio of 1 or less, 0.5 or less, or 0.44 or less. Such COD/N ratios are operably advantageous for the anammox bacteria in the one or more anoxic chambers 302. If higher COD happens to be present, the anammox bacteria may not remove nitrogen effectively, as heterotrophic denitrification may become prevalent and impair the sustainability of the present system 100. The COD/N ratio of the wastewater fed to the deammonication unit, even if from the degasser 206, may be controlled by the operation of the anaerobic reactor 204 in stage A 200, which is one advantage of having the anaerobic reactor 204 as the lead (most upstream) reaction unit.

In various aspects, the degasser 206 may be connected to a vacuum pump operable to recover the biogas dissolved in the wastewater from the anaerobic reactor 204.

In stage B 300, the present system 100 may include the deammonification unit as described above. The deammonification unit may include one or more anoxic chambers 302 and one or more oxic chambers 304. For example, the deammonification unit may be operable with one anoxic chamber 302 and one oxic chamber 304, in the sequence already set out above, i.e. oxic chamber 304 is downstream and adjacent to the anoxic chamber 302. In various aspects, the plurality of biocarriers 306 housed in an anoxic chamber may occupy a volume of 30% to 50%, 30% to 40%, or 40% to 50%, wherein the volume percentage may be calculated as volume of biocarriers 306 in an anoxic chamber 302 divided by volume of that anoxic chamber 302.

The anammox bacteria may be attached or immobilized on the biocarriers 306 as a biofilm thereon. With this, the present system 100 and process circumvents bioaugmentation, at least for anammox bacteria, as the anammox bacteria do not get easily washed or transported away by treated wastewater channeled out of the deammonification unit and system 100.

In various aspects, each of the one or more anoxic chambers 302 and each of the one or more oxic chambers 304 may be configured to have a volume ratio ranging from 1:1 to 4:1, 1:1 to 4:3, etc. This may render a relatively short oxic hydraulic retention time (HRT) beneficial for NOB repression.

In various aspects, oxygen 3 may be supplied to all of the one or more oxic chambers 304 for producing the nitrite from the ammonia and/or ammonium. Advantageously, there is no need to maintain low dissolved oxygen, and the supply of oxygen 3 helps in partial nitritation, which converts ammonia and/or ammonium to nitrite by ammonia oxidizing bacteria (AOB).

In various aspects, the present system 100 may further include a clarifier 500 or a membrane filtration unit 700 operable to separate sludge from the wastewater processed in the deammonification unit and to recycle the sludge to the most upstream anoxic chamber 302.

In various aspects, the present system 100 may further include a reverse osmosis unit 702 arranged in fluid communication and downstream of the membrane filtration unit 700, wherein (i) the membrane filtration unit and (ii) the reverse osmosis unit are operable to produce water. The water produced may be of a grade comparable or even higher than potable water for use in industrial plants, e.g. for fabrication of semiconductors.

Figure 1B:
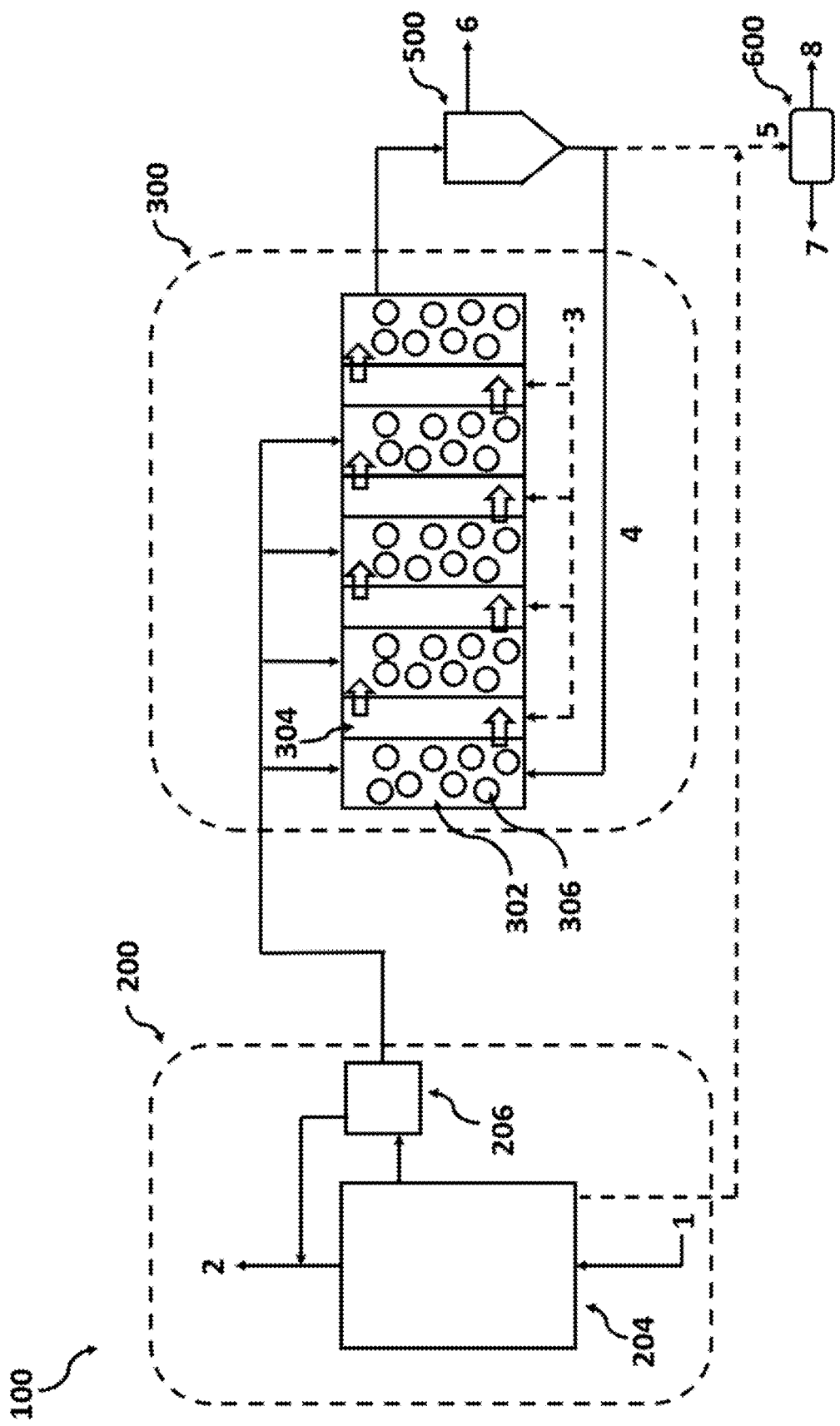
FIG. 1B is another schematic diagram of an example of A-B system 100 and process of the present disclosure, adapted from the A-B system of FIG. 1A, wherein an anaerobic digester 600 is positioned downstream of the clarifier 500 and operable to recover any remaining biogas 7 from excess sludge 5 and reduce sludge volume for any reduced volume excess sludge 8 to be purged from system 100. The anaerobic digester 600 may also receive sludge from anaerobic reactor 204. Various pumps shown in FIG. 1A are not shown in FIG. 1B for brevity but may be similarly included.
Figure 1C:
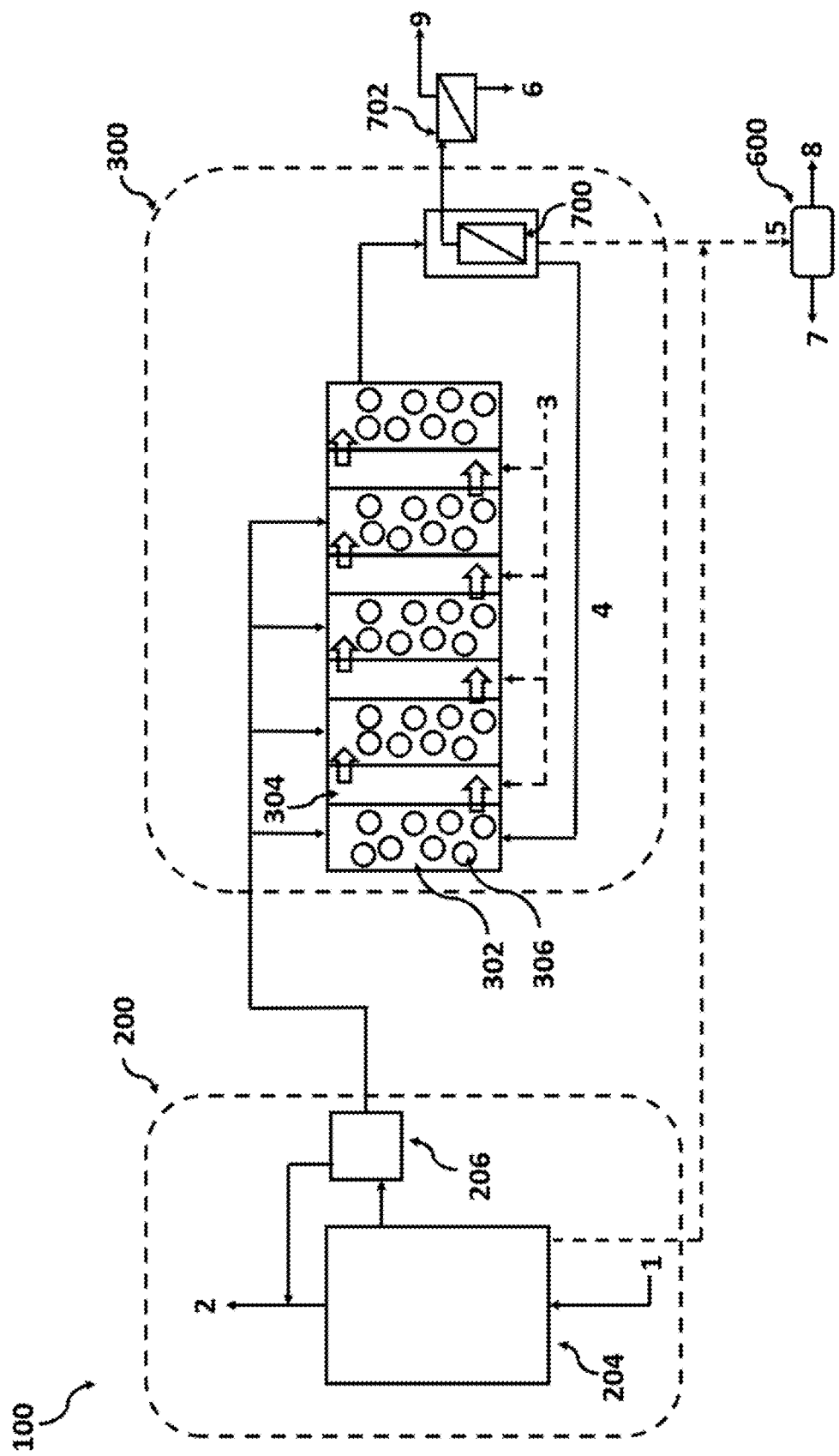
FIG. 1C is another schematic diagram of an example of A-B system 100 and process of the present disclosure, adapted from the A-B system of FIG. 1B, wherein the clarifier 500 is replaced with a reverse osmosis unit 702 and stage B 300 includes a standalone microfiltration or ultrafiltration unit 700. The microfiltration or ultrafiltration unit 700 receives effluent from the most downstream anoxic chamber 302, and permeate from the microfiltration or ultrafiltration unit 700 is fed to the reverse osmosis unit 702 while the retentate is fed to the anaerobic digester 600. Effluent from the system 100 is recovered as a permeate 6 from the reverse osmosis unit 702. The retentate 9 from the reverse osmosis unit 702 may be discharged or further treated. Various pumps shown in FIG. 1A are not shown in FIG. 1C for brevity but may be similarly included.
Figure 1D:
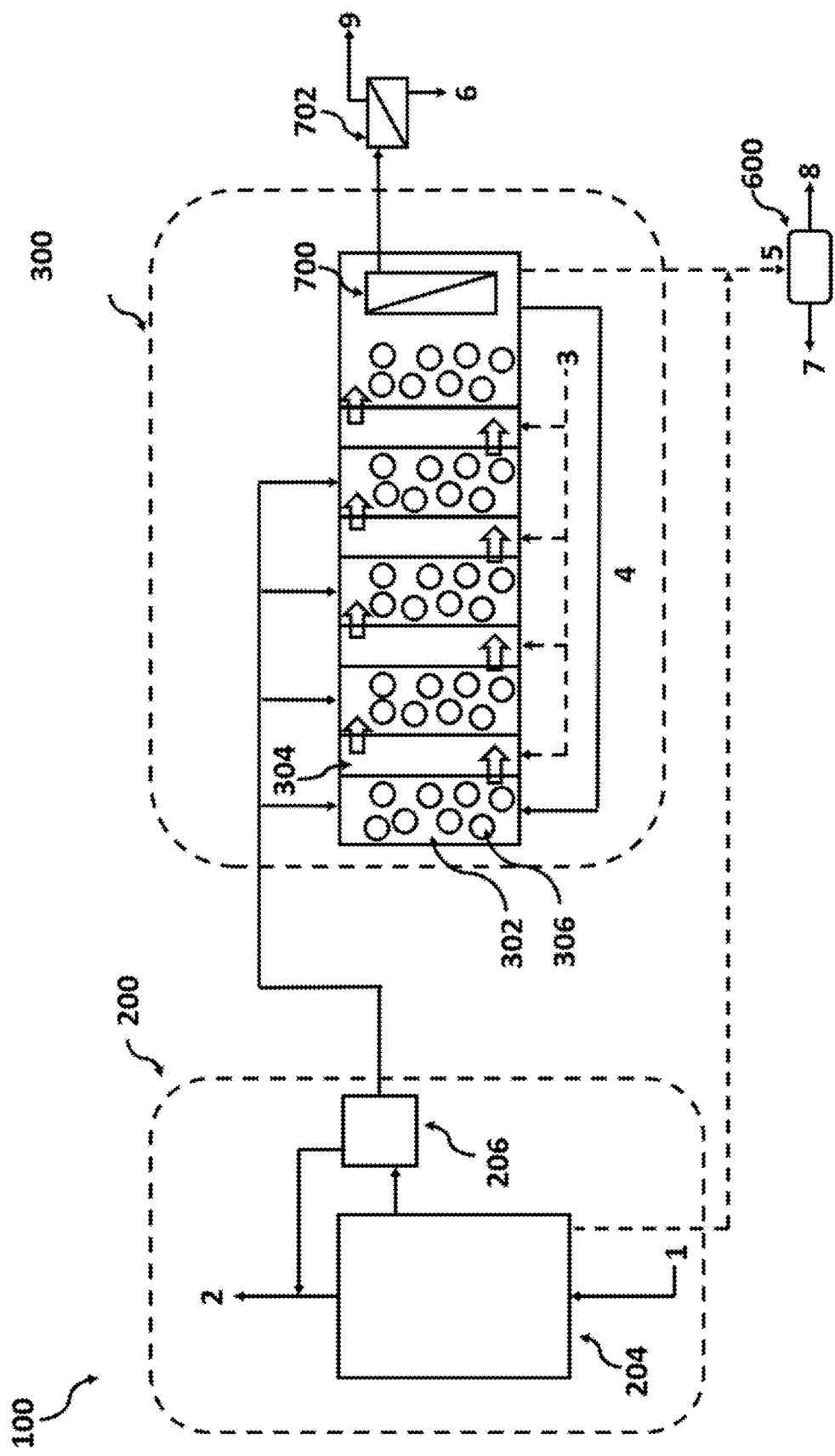
FIG. 1D is another schematic diagram of an example of A-B system 100 and process of the present disclosure, adapted from the A-B system of FIG. 1B, wherein the clarifier 500 is replaced with a reverse osmosis unit 702 and stage B 300 includes an integrated microfiltration or ultrafiltration unit 700. The integrated microfiltration or ultrafiltration unit 700 is configured in the most downstream anoxic chamber 302, wherein effluent from the most downstream anoxic chamber 302 may be channeled out in two streams, one as a permeate to a reverse osmosis unit 702 and the other as a retentate containing the excess sludge 5 to the anaerobic digester 600. Effluent from the system 100 is recovered as a permeate 6 from the reverse osmosis unit 702. The retentate 9 from the reverse osmosis unit 702 may be discharged or further treated. Various pumps shown in FIG. 1A are not shown in FIG. 1D for brevity but may be similarly included.

In aspects where two or more anoxic chambers 302 are present, the membrane filtration unit 700 may be integrated in the most downstream anoxic chamber 302, wherein an example is shown in FIG. 1D. That is to say the membrane filtration unit 700 may be housed therein.

In various embodiments, the present system 100 may further include an anaerobic digestion unit 600 operable to (a) receive sludge 5 from (i) the anaerobic reactor 204, and/or (ii) the clarifier 500 or the membrane filtration unit 700, and (b) to produce biogas 7 from the sludge 5.

In various embodiments, the membrane filtration unit 700 may include a membrane bioreactor, a microfiltration unit and/or an ultrafiltration unit. The membrane bioreactor may operate using microfiltration or ultrafiltration membranes.

Accordingly, the present system 100 is versatile in that various types of filtration units can be integrated thereto, downstream of the deammonification unit.

The present disclosure also provides for a deammonification process for treating wastewater. Various aspects, embodiments and advantages described for the present system 100 can be analogously valid for the present process subsequently described herein, and vice versa. As the various aspects, embodiments and advantages have already been described above and examples demonstrated herein, they shall not be iterated for brevity.

The present deammonification process for treating wastewater may include introducing the wastewater 1 to an anaerobic reactor 204 operable to produce a biogas 2 from organic carbon in the wastewater 1, optionally feeding the wastewater from the anaerobic reactor to a degasser 206, wherein the wastewater from the anaerobic reactor 204 may include the biogas dissolved therein, wherein the degasser 206 is operable to recover the biogas dissolved in the wastewater from the anaerobic reactor 204, and treating the wastewater from, for example, the anaerobic reactor 204 and/or the degasser 206, in a deammonification unit, wherein the deammonification unit may include (i) one or more anoxic chambers 302 in fluid communication with the anaerobic reactor 204 and/or the degasser 206, wherein each of the one or more anoxic chambers 302 may house a plurality of biocarriers 306, wherein each of the plurality of biocarriers 306 may include a biofilm of anaerobic ammonium oxidation bacteria, and (ii) one or more oxic chambers 304 operable to produce nitrite from ammonia and/or ammonium, wherein the wastewater processed in an anoxic chamber 302 of the one or more anoxic chambers 302 is channeled to an oxic chamber 304 of the one or more oxic chambers 304 which is adjacent to and downstream of the anoxic chamber 302.

In various aspects, introducing the wastewater 1 to the anaerobic reactor 204 may include operating the anaerobic reactor 204 with the wastewater retained therein for 2 to 10 hours, 4 to 10 hours, 6 to 10 hours, 8 to 10 hours, etc.

The present process may further include operating the anaerobic reactor 204 to render the wastewater from, for example, the anaerobic reactor 204 and/or the degasser 206, which is fed to the one or more anoxic chambers 302, to have a COD/N ratio of 1 or less, 0.5 or less, or 0.44 or less.

In various aspects, feeding the wastewater from the anaerobic reactor 204 to the degasser 206 may be optional and may include agitating the wastewater from the anaerobic reactor 204 in a flash chamber to recover the biogas dissolved in the wastewater from the anaerobic reactor 204.

In various aspects, feeding the wastewater from the anaerobic reactor 204 to the degasser 206 may be optional and may include channeling the wastewater from the anaerobic reactor 204 to a mixing chamber 800 having or in fluid communication with one or more overflow weirs 804 arranged in a cascading manner, wherein the wastewater is channeled from the mixing chamber 800 to a cascade chamber 802 of the degasser 206, wherein the cascade chamber 802 is operable to strip the biogas dissolved in the wastewater from the anaerobic reactor 204, and wherein the wastewater from the cascade chamber 802 is to be channeled to the one or more anoxic chambers 302.

In various aspects, feeding the wastewater from the anaerobic reactor 204 to the degasser 206 may be optional and may include operating a vacuum pump to recover the biogas dissolved in the wastewater from the degasser 206.

In various aspects, the biogas may include methane, carbon dioxide, etc. In various aspects, the biogas may be methane.

In various aspects, treating the wastewater from, for example, the anaerobic reactor 204 and/or the degasser 206, in the deammonification unit may include providing oxygen 3 to all of the one or more oxic chambers 304 to maintain dissolved oxygen therein at a concentration ranging from 0.3 mg $O_2$/L to 2 mg $O_2$/L, 0.5 mg $O_2$/L to 2 mg $O_2$/L, 1 mg $O_2$/L to 2 mg $O_2$/L, or 1.5 mg $O_2$/L to 2 mg $O_2$/L.

The present process may further include channeling the wastewater processed in the deammonification unit to a clarifier 500 or a membrane filtration unit 700, and operating the clarifier 500 or the membrane filtration unit 700 to separate sludge from the wastewater processed in the deammonification unit and to recycle the sludge to the most upstream anoxic chamber 302 at a rate ranging from 0.5 to 2.5 times, 1 to 2.5 times, 1.5 to 2.5 times, or 2 to 2.5 times, of a flowrate of the wastewater 1 introduced to the anaerobic reactor 204.

The present process may further include operating (i) the membrane filtration unit 700 to separate sludge from the wastewater processed in the deammonification unit and to recycle the sludge to the most upstream anoxic chamber 302 at a rate ranging from 0.5 to 2.5 times, 1 to 2.5 times, 1.5 to 2.5 times, or 2 to 2.5 times, of a flowrate of the wastewater 1 introduced to the anaerobic reactor 204, and (ii) a reverse osmosis unit 702 arranged in fluid communication and downstream of the membrane filtration unit 700, to produce water.

The present process may further include operating an anaerobic digestion unit 600 to (a) receive sludge 5 from (i) the anaerobic reactor 204, and/or (ii) the clarifier 500 or the membrane filtration unit 700, and (b) to produce biogas 7 from the sludge 5.

The word "substantially" does not exclude "completely" e.g. a composition which is "substantially free" from Y may be completely free from Y. Where necessary, the word "substantially" may be omitted from the definition of the disclosure.

In the context of various aspects, the articles "a", "an" and "the" as used with regard to a feature or element include a reference to one or more of the features or elements.

In the context of various aspects, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to an A-B process for sustainable municipal wastewater treatment and optionally for further wastewater reclamation. The present A-B process achieves sustainable mainstream deammonification without anammox bacteria bioaugmentation as the anammox bacteria could be effectively retained in the form of biofilm on biocarriers 306 and maintain high activity without oxygen inhibition in the anoxic chamber 302. Sustainable nitritation can be achieved in the deammonification unit (termed herein a step-feed reactor) of the present system 100 without applying a low dissolved oxygen (DO) concentration strategy that may compromise the activity of ammonia oxidizing bacteria (AOB).

The present system 100 and process synergistically integrate a deammonification single stage unit into an A-B process configuration, wherein COD can be effectively captured for direct energy recovery at the A stage 200, while nitrogen was removed through deammonification in the single stage continuous step-feed reactor at B-stage 300. The present process is operably feasible for achieving sustainable and stable mainstream deammonification for cost-effective removal of ammonium from municipal wastewater.

The present deammonification system 100 and process are described in further details, by way of non-limiting examples, as set forth below.

Example 1A

Analytical Methods

COD, $NH_4^+$—N, $NO_2^-$—N, and volatile suspended solids (VSS) were determined according to standard methods, for example, standard methods for the examination of water and wastewater, American Public Health Associate (APHA), 2005. To measure the dry biomass of the attached biofilm, biofilms were scraped off from the biocarriers 306 and the collected pellets were further used for determination of fixed VSS. The composition of biogas produced in the anaerobic reactor 204 (e.g. anaerobic fixed bed reactor (AFBR)) was analyzed by a gas chromatography equipped with thermal conductivity detector (GC-TCD) (Agilent Technologies 7890A GC system, USA), while its volume was measured by a drum-type gas meter (TG 0.5/6, Ritter, Germany). The ratio of $NO_3^-$—$N_{eff}$/$NH_4^+$—$N_{removed}$ was calculated to reflect the effectiveness of nitrite oxidizing bacteria (NOB) repression.

The theoretical electricity production via methane combustion, $E_{CH4}$ (kWh/m³) can be calculated by equation (1):

$$E_{CH4}=Q_{CH4} \times CV_{CH4} \times f \times e \qquad (1)$$

wherein $Q_{CH4}$ is the methane production rate in $m^3 CH_4/m^3$ wastewater, $CV_{CH4}$ is the combustion value of methane, i.e. 40 MJ/m³ methane, f is the efficiency of electricity generation engine, i.e. 30%; e is the conversion coefficient of energy (MJ) to electrical energy (kWh) with a value of 0.28.

Figure 10:
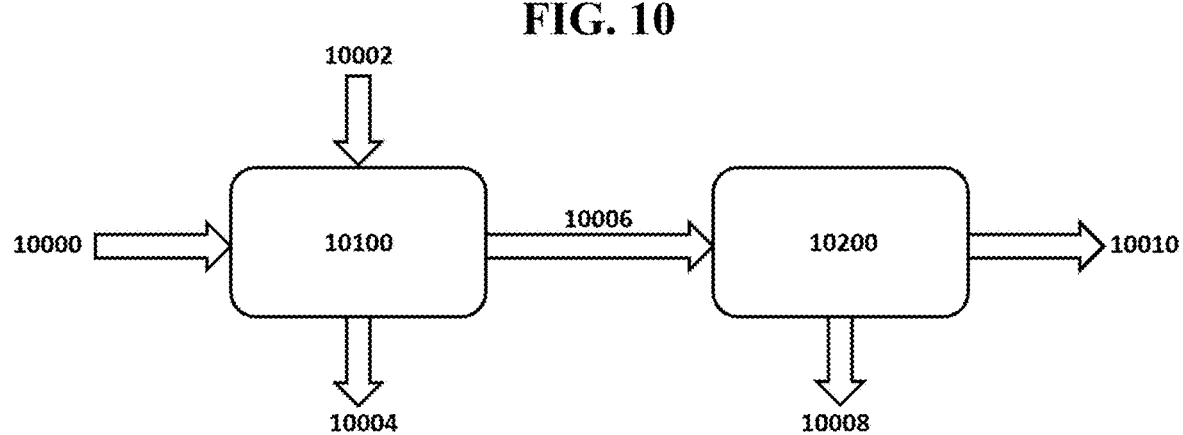
FIG. 10 shows an example of the nitrogen mass balance on the step-feed reactor of FIG. 9. 10000 denotes $(n-1)Q_{sf}+Q_r$ and $S_{n-1,out}$, 10002 denotes $Q_{sf}$ and $S_{inf}$, 10004 denotes $\Delta S_{An}$, 10006 denotes $nQ_{sf}+Q_r$ and $S_{An,out}$, 10008 denotes $\Delta S_{On}$, 10010 denotes $nQ_{sf}+Q_r$ and $S_{On,out}$, 10100 denotes $A_n$ which refers to the $n^{th}$ anoxic chamber. 10200 denotes $O_n$ which refers to the $n^{th}$ oxic chamber.

The nitrogen mass balance in the step-feed reactor was performed during steady-state operation to investigate the nitrogen conversion and removal in each chamber by equations (2) to (4) and as illustrated in FIG. 10.

Figure 9:
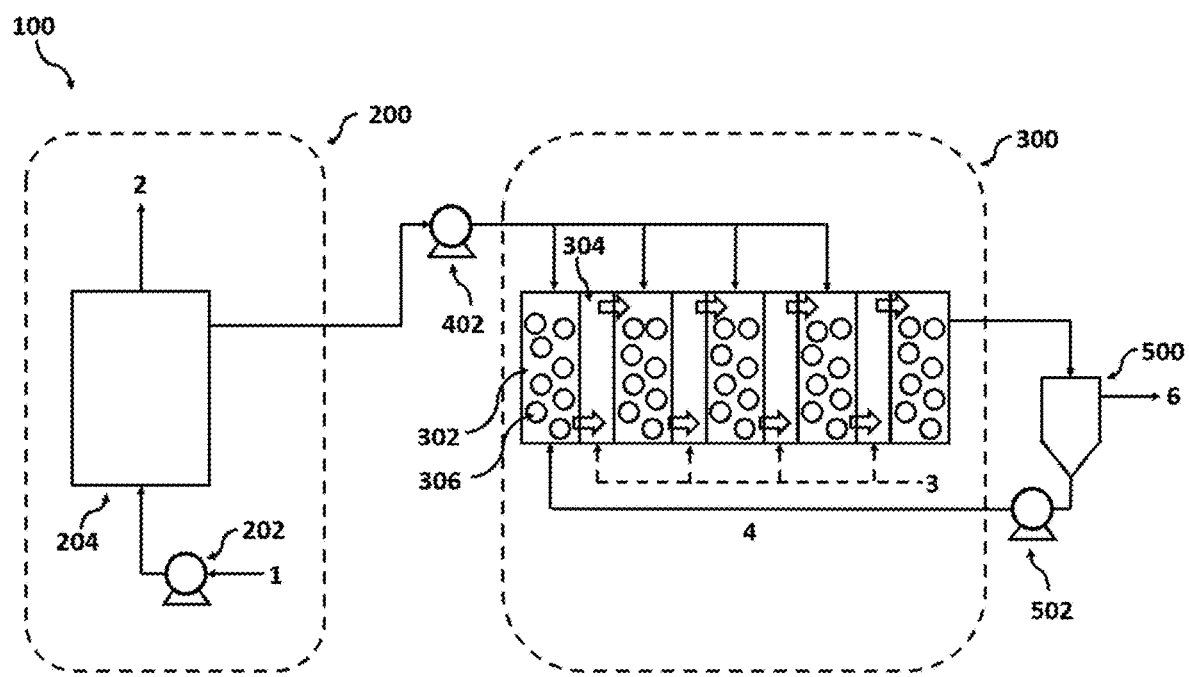
FIG. 9 is another schematic diagram of an example of A-B system 100 wherein no degasser 206 is involved. The reference numerals used in FIG. 9 refer to the same components denoted by the same reference numerals throughout the figures.

Four anoxic chambers (e.g. A1 to A4 of the one or more anoxic chambers 302), using FIG. 9 as an example:

$$[(n-1)Q_{sf}+Q_r] \cdot S_{O_{n-1},out}+Q_{sf} \cdot S_{inf}=(n \cdot Q_{sf}+Q_r) \cdot S_{A_n,out}+\Delta S_{A_n} \qquad (2)$$

Four oxic chambers (e.g. O1 to O4 of the one or more oxic chambers 304), using FIG. 9 as an example:

$$(n \cdot Q_{sf}+Q_r) \cdot S_{A_n,out}=(n \cdot Q_{sf}+Q_r) \cdot S_{O_n,out}+\Delta S_{O_n} \qquad (3)$$

For a fifth anoxic chamber (i.e. A5 of the one or more anoxic chambers 302), using FIG. 9 as an example:

$$4Q_{sf} \cdot S_{O_4,out}=(n \cdot Q_{sf}+Q_r) \cdot S_{A_5,out}+\Delta S_{A_5} \qquad (4)$$

where n is the sequence number of the chambers, $Q_{sf}$ is the step-feed flow rate (L/day), $Q_r$ is the returned flow rate (L/day), $S_{inf}$, $S_{O_{n-1},out}$ and $S_{A_n,out}$ are the concentration of nitrogen species in the step-feed flow, in the effluent of chamber $O_{n-1}$ and in the effluent of chamber $A_n$, respectively (mg N/L), $\Delta S_{A_n}$ and $\Delta S_{O_n}$ are the removal or production rate of the nitrogen species in chamber $A_n$ and $O_n$, respectively (mg N/day). For chamber $A_1$, the concentration of the nitrogen species in the returned flow should be $S_r$ (mg N/L). $A_n$ denotes $n^{th}$ anoxic chamber, $O_n$ denotes $n^{th}$ oxic chamber.

The activities of ammonia oxidizing bacteria (AOB) and NOB in the deammonification unit were quantified by the respective specific oxygen uptake rates (SOUR) that were determined according to a method described as follows, using a DO (dissolved oxygen) meter (YSI 5100, USA). Initially, total OUR ($OUR_{total}$) was measured followed by dosing a certain amount of $NaClO_3$ for nitrite oxidation inhibition to obtain OUR of ammonia/ammonium oxidation and organic carbon oxidation ($OUR_{NH4+organic\ carbon}$). Then, a certain amount of ATU (allylthiourea) was dosed for ammonia/ammonium oxidation inhibition to obtain the OUR of organic carbon oxidation ($OUR_{organic\ carbon}$). The SOUR of AOB ($SOUR_{AOB}$) could be calculated as ($OUR_{NH4+organic\ carbon}-OUR_{organic\ carbon}$)/VSS, while SOUR of NOB ($SOUR_{NOB}$) could be calculated as ($OUT_{total}-OUR_{NH4+organic\ carbon}$)/VSS.

The specific anammox activities (SAA) was performed by ex-situ anoxic batch tests according to a method described as follows. A certain amount of biocarriers were collected, washed with phosphate-buffered saline, and then placed in flasks. Subsequently, substrate solution containing 20 mg N/L of $NH_4^+$—N and $NO_2^-$—N, respectively, were de-oxygenated by $N_2$ gas sparging and then poured into the flasks, which were sealed and then placed on shakers for anammox reaction. Liquid samples were taken at intervals for ammonium, nitrite and nitrate analyses. In the end, the biofilm on biocarriers was harvested to determine the amount of biomass. The initial concentrations of $NH_4^+$—N and $NO_2^-$—N were about 20 mg N/L.

Example 1B

Quantitative Polymerase Chain Reaction (PCR)

DNA of the suspended sludge and harvested anammox biofilm were extracted by a Fast DNA spin kit (MP Biomedicals, LLC). The copy numbers of 16S rRNA genes representing key functional species were determined by quantitative PCR using SybrGreen assays with primers listed in FIG. 2. "a" in FIG. 2 denotes a mix of CTO189fA-B (GGAGRAAAGCAGGGGATCG) (SEQ ID NO: 1) and CTO189fC (GGAGGAAAGTAGGGGATCG) (SEQ ID NO: 2) at ratio of 2:1. The primers may include438f/A684r.

Example 2A

General Examples of Present System

From FIG. 1A to 1D, it can be seen that the present system, operable for wastewater treatment, includes an anaerobic reactor 204, a degasser 206 coupled to the anaerobic reactor 204, a step-feed reactor coupled to the degasser 206, and either (i) a clarifier 500 or (ii) a membrane filtration unit 700 (e.g. a membrane bioreactor, a microfiltration unit, or an ultrafiltration unit) and a reverse osmosis unit 702 coupled to the step-feed reactor. The membrane bioreactor may be operable for microfiltration or ultrafiltration.

The present system 100 is operable for a wastewater treatment process, which may be described as having an A-B stage configuration. The process includes introducing an influent 1 into the anaerobic reactor 204 at the A-stage 200 for energy recovery through converting organic carbon in the influent 1 (e.g. municipal wastewater) into a biogas 2, such as methane. The process may include passing an anaerobic effluent from the anaerobic reactor 204 into the degasser 206 for dissolved biogas (e.g. methane) recovery. The process includes feeding the degassed anaerobic effluent from the degasser 206 into a step-feed reactor at the B-stage 300 for mainstream deammonification.

The process may include feeding the B-stage 300 effluent into (1) a clarifier 500 for biomass separation or (2) a membrane bioreactor 700 (MBR) for effective biomass retention and solids-free effluent production, feeding the MBR effluent from the membrane bioreactor 700 in (2) into a reverse osmosis (RO) unit 702 to purify the MBR effluent, feeding the excess sludge 5 produced from A-stage 200, B-stage 300 and/or the clarifier 500 into an anaerobic digester 600 for biogas production 7, wherein the B-stage 300 includes a step-feed reactor including a series of alternate anoxic 302 and oxic 304 chambers, for example, with a total number of chambers greater or equal to 4. The volume ratio of each anoxic chamber 302 to each oxic chamber 304 may range from 1:1 to 4:3, 1:1 to 4:1, for example, 4:3.

Each of the anoxic chambers 302 may be packed with biocarriers 306 including anammox biofilms, wherein the biocarriers 306 in each anoxic chamber 302 may occupy 30% to 50% of the anoxic chamber 302).

The anaerobic reactor 204 in A-stage 200 may be, without being limited to, an anaerobic membrane bioreactor (AnMBR), an upflow anaerobic sludge blacket reactor (UASB), an expanded granular sludge bed reactor (EGSB), an anaerobic moving bed biofilm reactor (AMBBR), an anaerobic baffled reactor (ABR), upflow anaerobic fixed-bed reactor (UAFBR), for example, an anaerobic fixed bed reactor (AFBR).

Example 2B

Discussion of the General Examples

The present system 100 and process demonstrated and described by way of examples set forth in FIG. 1A to 1D provide a holistic approach for achieving sustainable and stable mainstream municipal wastewater reclamation with reduced energy consumption, improved energy recovery and significantly reduced sludge production.

The A-B system 100 and process involve an anaerobic treatment as the lead for direct COD capture prior to biological oxidation of COD into biomass. As such, excess activated sludge can be reduced by more than 75% compared to conventional CAS processes.

The A-B system 100 and process with the anaerobic treatment as lead could directly convert more than 70% of the influent COD to biogas (e.g. methane) compared to a conversion percentage of 30% achieved in conventional CAS process. Moreover, the anaerobic treatment also renders a low COD/N ratio of 1 or below. For example, a COD/N ratio of 0.44 was achieved in the preliminary trials, which is favorable for the subsequent anammox process of B-stage 300.

The A-B system 100 and process are integrated with a degasser 206 for effective recovery of dissolved methane from an anaerobic effluent of the anaerobic reactor 204, rendering improved energy recovery and mitigation of greenhouse gas emission.

The A-B system 100 and process can achieve sustainable mainstream deammonification without anammox bacteria bioaugmentation, as the anammox bacteria in the present system 100 and process could be effectively retained in the form of biofilm on biocarriers 306, which maintains high activity of the anammox bacteria without oxygen inhibition in an anoxic chamber 302.

The A-B system 100 and process can achieve successful NOB repression through the alternative anoxic chambers 302 arrangement in the step-feed reactor, which serves as a disturbance that provides for NOB repression. Moreover, the sludge retention time (SRT) of the suspended nitrifying bacteria is decoupled from that of anammox bacteria and could be regulated for NOB outselection without compromising the retention of anammox bacteria.

The A-B system 100 and process are operable to produce high quality product with microfiltration/ultrafiltration and reverse osmosis integrated therein.

Example 3

Comparative Example

The A-B system 100 and process incorporate a dissolved methane recovery unit, making the process more energy beneficial and environmentally sustainable. Sludge production in the present system 100 and process can be substantially reduced by more than 75%. More than 70% of the influent COD could be converted to methane, which is about two times higher than that of conventional CAS processes.

As already mentioned above, sustainable and stable mainstream deammonification could be achievable in the step-feed reactor without bioaugmentation. The single-stage deammonification process of the present disclosure is easily operable compared to conventional water treatment processes, including those that require bioaugmentation.

The sustainable nitritation afforded by the present system 100 and process could be achieved in the step-feed reactor without applying a low DO concentration strategy that may compromise the AOB activity. The anammox bacteria are retained in the anoxic chambers 302 in the form of biofilms on biocarriers 306 and is able to maintain high activity.

Integration of microfiltration/ultrafiltration units 700 and reverse osmosis unit 702, the A-B system 100 and process are able to produce water that can be of a higher grade than potable water.

The A-B system 100 and process is operably energy neutral, or even energy positive, compared to conventional wastewater treatment plants that are energy-negative. For the purpose of illustration, the present process was compared against a conventional CAS process employed in the Ulu Pandan wastewater reclamation plant (WRP) in Singapore, wherein the plant has a treatment capacity of 361,000 m$^3$/d and influent COD and nitrogen concentration of 638 mg/L and 55 mg/L, respectively, and the results are summarized in Table 1 below.

TABLE 1

Energy analysis of the A-B process as compared
with CAS process in Ulu Pandan WRP

|  | Conventional CAS process | Present A-B process |
|---|---|---|
| Sludge production (ton VSS/d) | 65.3 | 10.7 |
| Total energy consumption (kWh/m$^3$) | −0.44 | −0.18 |
| Sludge treatment | −0.07 | −0.01 |
| Aeration | −0.23 | −0.03 |
| Others (e.g. pumping etc.) | −0.14 | −0.14[b] |
| Net recoverable energy (kWh/m$^3$) | 0.15 | 0.45 |
| Net energy gain (kWh/m$^3$) | −0.29 | 0.27 |

[b]denotes that the energy consumption under the category of others was assumed to be identical to the conventional CAS process.

Example 4A

Discussion on Process Performance Based on System of FIG. 1A

Figure 3:
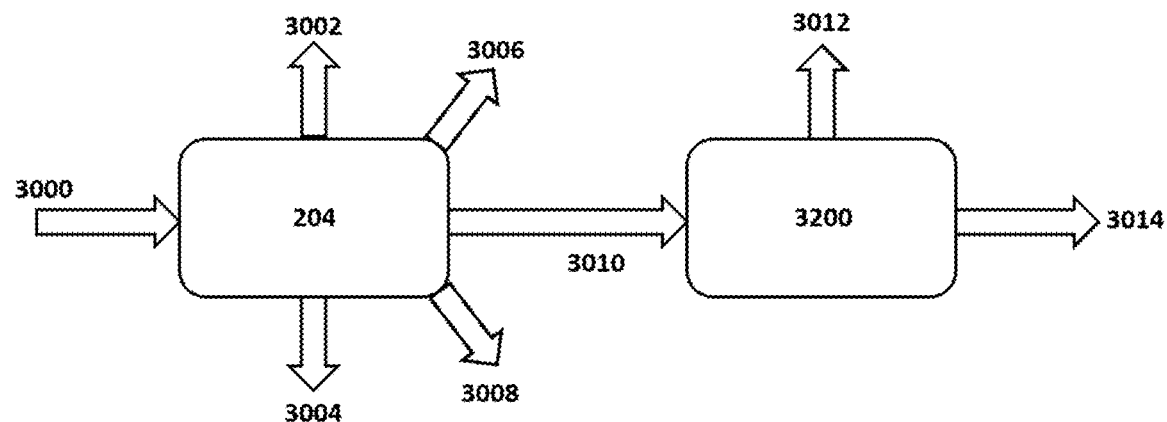
FIG. 3 is a schematic diagram showing an example of the COD mass flow of the present process using the present system 100. Stream 3000 denotes an influent with 387 mg COD/L fed to the anaerobic reactor 204 of A stage 200. Stream 3002 denotes gaseous methane with 189 mg COD/L. Stream 3004 denotes sludge with 27 mg COD/L. Stream 3006 denotes dissolved methane with 116 mg COD/L. Stream 3008 denotes uncharacterized substances with 36 mg COD/L. Stream 3010 denotes an anaerobic effluent with 19 mg COD/L fed to deammonification reactor 3200 of the B stage 300. Stream 3012 denotes uptake by heterotrophs (if based on, for example, system of FIG. 1A) or uncharacterized substances (if based on, for example, system of FIG. 9) with 4 mg COD/L. Stream 3014 denotes the effluent with 15 mg COD/L.

FIG. 3 shows a diagram illustrating the influent COD concentration being significantly reduced from 387 mg/L to about 19 mg/L in the A stage 200 AFBR 204, 79% of which was directly channeled to methane. However, 38% of methane produced was found to be in its dissolved form with a concentration of 29 mg/L. It was demonstrated that the flash chamber 206 was able to recover 91% of dissolved methane. In addition, the observed sludge production in the AFBR 204 was as low as about 0.05 g VSS/g COD, which was much lower than that of the activated sludge with a typical value of 0.4-0.5 g VSS/g COD. These suggested that the sludge production in the present system 100 would be 89% lower than that in the conventional activated sludge process. The detail COD flows are presented in FIG. 3. Most of the influent COD was removed at the A stage 200 and the final effluent COD concentration was as low as 15 mg/L.

Figure 4:
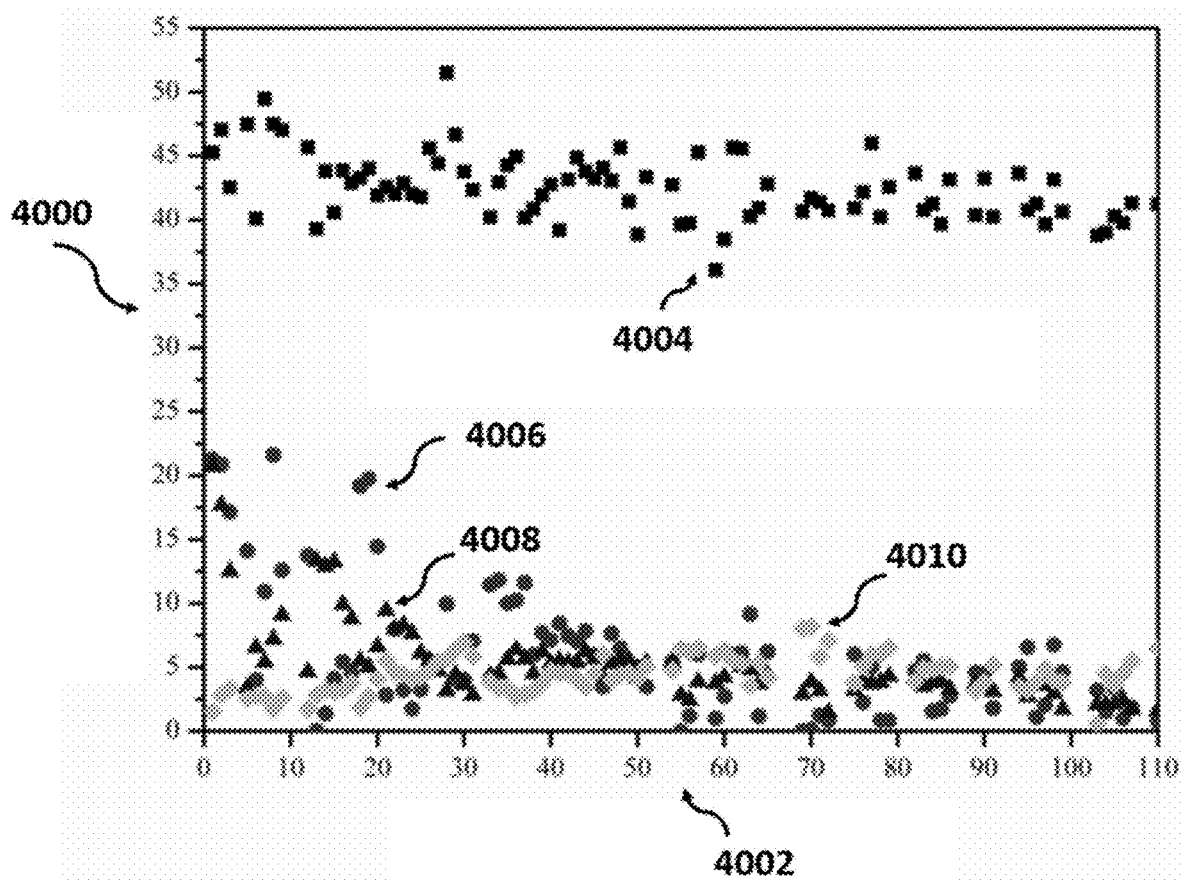
FIG. 4 shows an example of nitrogen profiles in the deammonification reactor 3200 of B stage 300 of FIG. 3. The vertical axis 4000 denotes nitrogen concentration (mg N/L) and horizontal axis 4002 denotes time (day). The concentration profile denoted by 4004 belongs to $NH_4^+{}_{feed}$. The concentration profile denoted by 4006 belongs to $NH_4^+{}_{eff}$. The concentration profile denoted by 4008 belongs to $NO_2^-{}_{eff}$. The concentration profile denoted by 4010 belongs to $NO_3^-{}_{eff}$.

As most COD in the wastewater was removed at the A stage 200 (FIG. 3), the COD/N ratio in the feed water to the B-stage 300 was found to be about 0.44, which was favorable for anammox. As shown in FIG. 4, the $NH_4^+$—N and $NO_2^-$—N concentrations gradually stabilized at 3.2 and 3.0 mg/L, while the $NO_3^-$—N concentration remained below 5 mg/L over the 110-day operation. Moreover, it appeared from FIG. 5 that the nitrogen removal indeed could be quickly stabilized within 10 days.

Example 4B

Discussion on Suppresion of NOB against AOB at Stage B Based on System of FIG. 1A Effective NOB repression is advantageous for sustainable short-cut nitrification which is a prerequisite for anammox. However, stable short-cut remains a big challenge in mainstream deammonification. The present operation strategy provides for effective NOB repression. In practice, the ratio of $NO_3^-$—$N_{eff}$/$NH_4^+$—$N_{removed}$ has been used to indicate the effectiveness of NOB repression. From FIG. 5, the ratio determined in this disclosure was very close its theoretical value of 0.11, i.e. the NOB activity was effectively repressed. Moreover, the repressed NOB activity was further confirmed by the results from the SOUR tests. It was found that the SOUR of AOB (i.e. 1.07±0.02 g $O_2$/g VSS·day) was about 6 times higher than that of NOB (i.e. 0.17±0.07 g $O_2$/g VSS·day).

Figure 6:
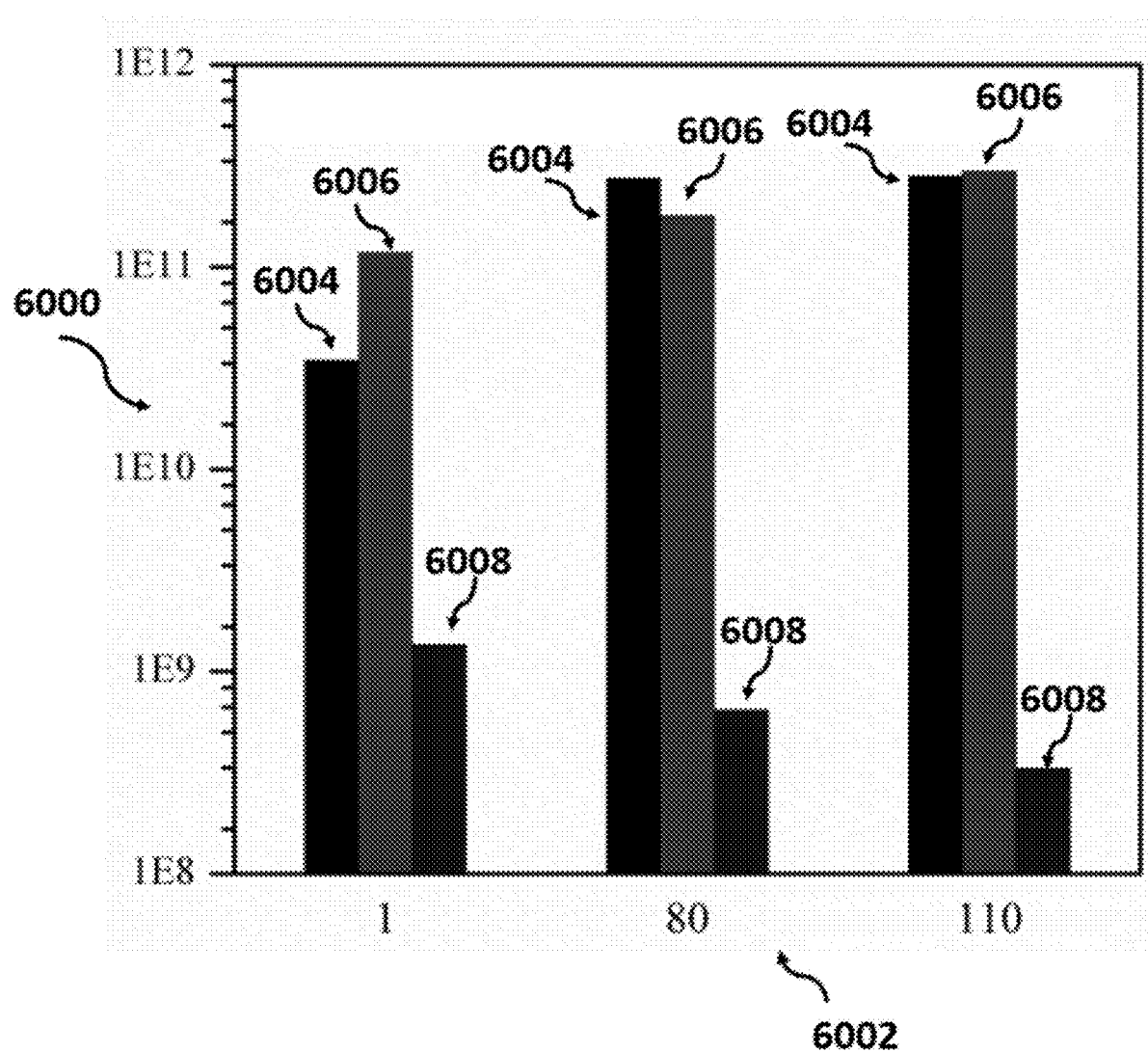
FIG. 6 shows examples of the respective abundances of nitrogen removal—associated species in the suspended sludge from B-stage 300 of the deammonification reactor of FIG. 1A. The vertical axis 6000 denotes functional gene copy numbers (copies/g VSS) and the horizontal axis 6002 denotes time (day). AOB, *Nitrospira* and *Nitrobacter* are denoted by 6004, 6006 and 6008, respectively.
Figure 7:
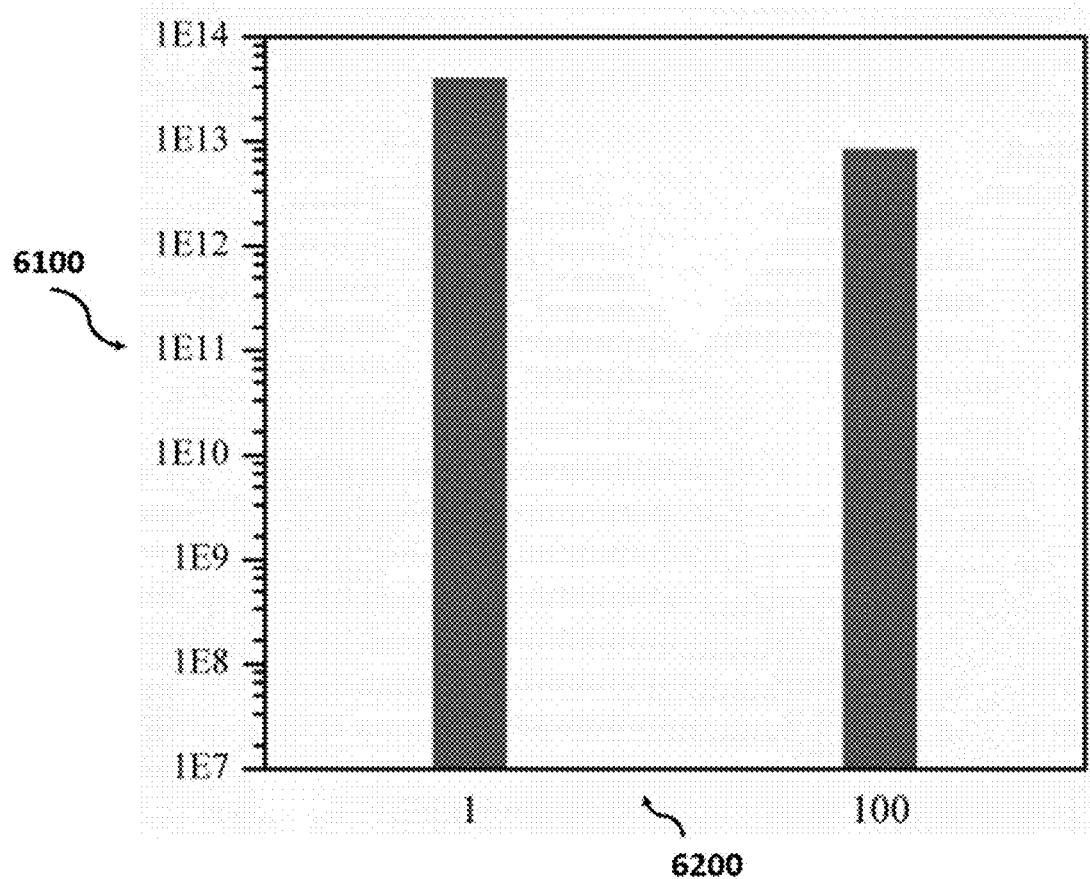
FIG. 7 shows an example of the abundances of anammox bacteria (copies/$m^2$ carrier) 6100 in the anammox biofilm from B-stage 300 of the deammonification reactor of FIG. 1A. The horizontal axis 6200 denotes time (day).
Figure 8:
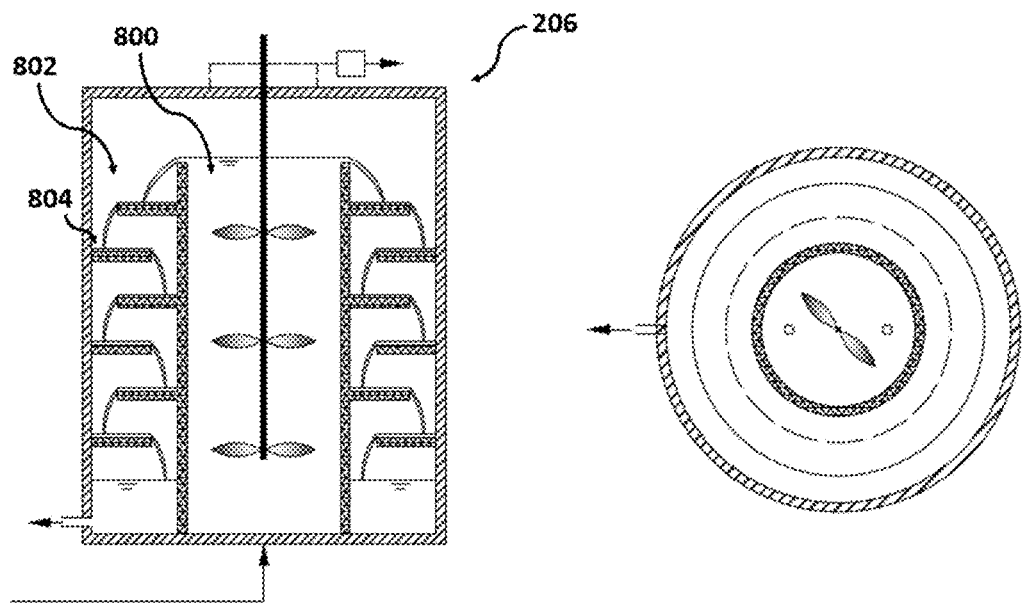
FIG. 8 shows an example of a cascade arrangement of overflow weirs 804 in a degasser 206 in the left cross-sectional image, wherein the degasser 206 is configured as having a mixing chamber 800 in fluid communication with one or more overflow weirs 804 arranged in a cascading manner, wherein the wastewater is channeled from the mixing chamber 800 to a cascade chamber 802 of the degasser 206. The right image shows the top-down view of the corresponding degasser 206 shown in the left image.

Meanwhile, FIG. 6 further revealed that that the copy number of AOB was increased by more than 8 times from day 1 to the end of the operation. On the contrary, the copy number of *Nitrospira* stayed relatively stable, while *Nitrobacter* experienced a clear declining trend. These in turn may explain the successful NOB repression against AOB achieved in the step-feed reactor. This can be attributed to the alternating shift of anoxic and oxic conditions in the step-feed reactor as described in FIG. 1A.

Example 4C

Summary of the System and Process of FIG. 1A

Although some mainstream deammonification processes have been reported, the process stability remains unresolved. For example, it is extremely difficult to maintain stable nitrite shunt due to reduced AOB activity, while anammox bacteria are often outcompeted by denitrifying bacteria. As such, the operation of reported deammonification processes largely depends on the process bioaugmentation with AOB and anammox bacteria harvested from sidestream processes. However, the present system and process, as discussed above, circumvents the need for bioaugmentation and the SOUR and quantitative PCR (qPCR) results clearly showed that AOB activity could be maintained at the high level against NOB activity.

The system and process of FIG. 1A is one example that demonstrated the feasibility of achieving sustainable and stable mainstream deammonification in the A-B process for most cost-effective removal of ammonium from municipal wastewater. In this process, 79% of the influent COD was directly converted to methane in the A-stage AFBR, while nitrogen removal efficiency reached up to 80% via deammonification in the B-stage step-feed mainstream deammonification reactor. The SOUR and qPCR results showed successful NOB repression throughout the whole operating period, indicating that the unique configuration of step-feed reactor was favorable for NOB repression.

Sustainable and stable mainstream deammonification was achieved without bioaugmentation for more than 100 days, which significantly reduced the operation complexity compared to other mainstream processes that require bioaugmentation. The present A-B process developed constitutes a paradigm shift of wastewater treatment plant operation from energy-negative to energy self-sufficient.

Example 5

Technical Discussion of Systems of FIG. 1B to 1D

The A-B system 100 and process can include (a) A stage 200, (b) B stage 300, (c) degasser 206, (d) a reverse osmosis unit 702, and/or (e) anaerobic digester 600, as depicted in FIG. 1B to 1D.

In the A stage 200, organic matter in wastewater is captured and converted to methane gas 2 in an anaerobic reactor 204. The preliminary study in an AFBR 204 showed that about 79% of influent COD was captured and converted to methane at a production yield of 0.3 L/g COD removed with the sludge yield of 0.09 g VSS/g COD which was 75% less than that in conventional CAS process. The energy that could be harvested from the produced methane was estimated to be about 0.57 kWh/m$^3$. It should be noted that all kinds of high rate anaerobic reactors can serve this purpose.

The startup and operation strategies are highly dependent on the type of anaerobic reactors. But generally, the hydraulic loading should be gradually increased to the designed loading. The hydraulic retention time (HRT) of the anaerobic reactor 204 could be controlled in the range of 2-10 hours depending on the characteristics and concentration of organics, temperature and the biomass concentration in the reactor 204. To avoid the competition between heterotrophic denitrifiers and anammox bacteria over nitrite, the COD/N ratio in the anaerobic effluent should be controlled at a relatively low level.

In the B stage, there is a step-feed reactor. In a preliminary study, 5 anoxic 302 and 4 oxic chambers 304 were adopted (FIG. 1B to 1D), while the volume ratio of each anoxic 302 to oxic chamber 304 is 4:3 in these examples. Other ratios may range from 1:1 to 4:1, 1:1 to 4:3, etc. depending on the situation, e.g. the temperature, nitrogen concentration and loading, dissolved oxygen (DO) concentration, etc. The anammox biocarriers 306 are packed into the anoxic chambers 302 at a volumetric ratio of 30-50%. The results showed that as most of the influent COD was removed at A stage 200, a low COD/N ratio, e.g. 0.44, was achieved in the feed to the B stage 300 step-feed reactor, which was favorable for anammox. In the B stage step-feed reactor, the effluent $NH_4^+$—N and $NO_2^+$—N were gradually removed and stabilized at about 3.2 mg/L and 3.0 mg/L, respectively, while the averaged $NO_3^-$—N concentration was found to be below 5 mg/L. Moreover, the preliminary study showed that a significant nitrogen removal of 60% could be quickly achieved within 10 days, indicating a fast start-up of the mainstream deammonification in the step-feed reactor. About 80% of TN removal was achieved at B stage (see Table 2 below) with successful NOB repression.

TABLE 2

COD and Nitrogen Concentrations for A and B stages

|  |  | A-stage | B-stage |
|---|---|---|---|
| Influent | COD (mg/L) | 387.8 | 19.0 |
|  | $NH_4^+$ (mg N/L) | 46.0 | 43.2 |
|  | COD/N ratio | 8.43 | 0.44 |
| Effluent | COD (mg/L) | 19.0 | 15.0 |
|  | $NH_4^+$ (mg N/L) | 43.2 | 3.2 |
|  | $NO_2^-$ (mg N/L) | — | 3.0 |
|  | $NO_3^-$ (mg N/L) | — | <5.0 |

The number of chambers, the volume ratio of the anoxic 302/oxic 304 chambers, and the packing density of the biocarriers 306 may vary depending on the wastewater quality. Any biocarriers 306 that support the growth of anammox biofilm may be used. To alleviate the water scarcity, the municipal wastewater treatment could be function-oriented, which means that the process (FIGS. 1C and 1D) can reclaim municipal wastewater to high-grade water for reuse through upgrading or retrofitting instead of discharge to the receiving water body (FIG. 1B). To this end, the microfiltration/ultrafiltration (MF/UF) 700 and reverse osmosis 702 technology could be incorporated. At B stage, the MF/UF 700 could be incorporated into the step-feed reactor when high effluent quality is required for subsequent reverse osmosis 702. The MF/UF membrane could be either housed in the last chamber of the step-feed reactor or in a stand-alone reactor following the step-feed reactor.

To maintain sustainable partial nitritation, NOB repression is achieved without compromising the activity of AOB. A SRT for the suspended sludge in the range of 4-12 days could be controlled through sludge discharge in the clarifier 500 or in the MBR 700, while the DO concentration in the oxic tanks 304 could be maintained in the range of 0.3-2.0 mg $O_2$/L. The anammox in the anoxic chamber 302 can be effectively retained with the use of biocarriers. The returned sludge flowrate 4 could be controlled in the range of 0.5-2.5 times of the influent flowrate 1. When MBR is employed, the flux could be controlled in the range of 10-25 LMH depending on the types of membrane adopted, water matrix and operation condition. The operation of MBR, i.e. time of permeate production and idle/backwash as well as chemical cleaning may follow the membrane manufacturer's specifications and operated accordingly under various situations.

For the degasser 206, briefly, it can be a combination of a rapid mixing unit and a vacuum unit, and if necessary, assisted by a special design of liquid falling cascade. The anaerobic effluent containing dissolved methane may be introduced into the degasser 206 from the bottom of the rapid mixing chamber 800, and then overflow into a liquid falling cascade chamber 802 via one or more overflow weirs 804. The degasser 206 may be further enhanced by application of a low-pressure vacuum pump installed on the top of the system. The degassed methane can then be harvested through the vacuum pump.

As shown in FIGS. 1C and 1D, a reverse osmosis unit may be integrated. As stated above, for water reclamation of municipal wastewater, the effluent of MBR 700 at B stage 300 may be subjected to RO treatment to produce high-grade reclaimed water for industrial or indirect potable usages. In a current "NEWater" production practice in Singapore, a conventional CAS process happened to be employed as the lead (most upstream reaction unit), followed by MF/UF and RO for high-grade water reclamation, while in the present systems 100 and processes (e.g. FIG. 1B to 1D), the upstream process includes an anaerobic reactor 204 followed by a B stage 300 step-feed reactor wherein both replaces the CAS process directly. The different upstream process may result in different influent quality to RO process. The flux could be controlled in the range of 15-25 LMH, while the recovery rate could be achieved above 75%.

As for the anaerobic digester 600, sludges produced from A stage 200 and B stage 300 can be anaerobically digested for biogas 7 production.

Example 6A

Integrated UAFBR and Step-Feed Reactor—Configuration and Operation

Another integrated process is demonstrated for the present deammonification system 100. In this example, no degasser 206 was used, an upflow anaerobic fixed-bed reactor (UAFBR) was employed for direct COD capture towards biogas 2 production while a step-feed reactor was specifically designed for deammonification (FIG. 9). The UAFBR was operated with a hydraulic retention time (HRT) of 6 hrs. The influent to the step-feed reactor with effective volume of 4.5 L was equally fed into the 4 anoxic chambers 302 (i.e. A1, A2, A3 and A4), which were packed with anammox bacteria-attached biocarriers 306 at 50% of the packing ratio, wherein the biocarriers 306 used in this disclosure as a non-limiting example is a K1 biocarrier (K1—a type of biocarrier used in this disclosure having a protected surface area of 500 $m^2/m^3$). The volume ratio of anoxic chambers 302 to oxic chambers 304 was designed to be 4:3 for enhancing anammox activity, while dissolved oxygen concentrations in the oxic chambers were maintained at 1.2 mg/L to 1.5 mg/L. The biocarriers 306 in the anoxic chambers 302 were agitated by nitrogen gas sparging. The system 100 was operated at 30±1° C. without sludge discharge and pH control. The HRT of the step-feed reactor was about 5.8 hrs with aerobic HRT of 10 mins to 13 mins and anoxic HRT of 14 mins to 17 mins in each chamber. The synthetic wastewater used in this disclosure mainly contained 400 mg COD/L as sucrose and 45 mg/L $NH_4^+$—N. Activated sludge was collected from a local WWTP and biocarriers 306 with anammox biofilm originated from another reactor in the laboratory.

Example 6B

Integrated UAFBR and Step-Feed Reactor—Process Performance

Figure 11:
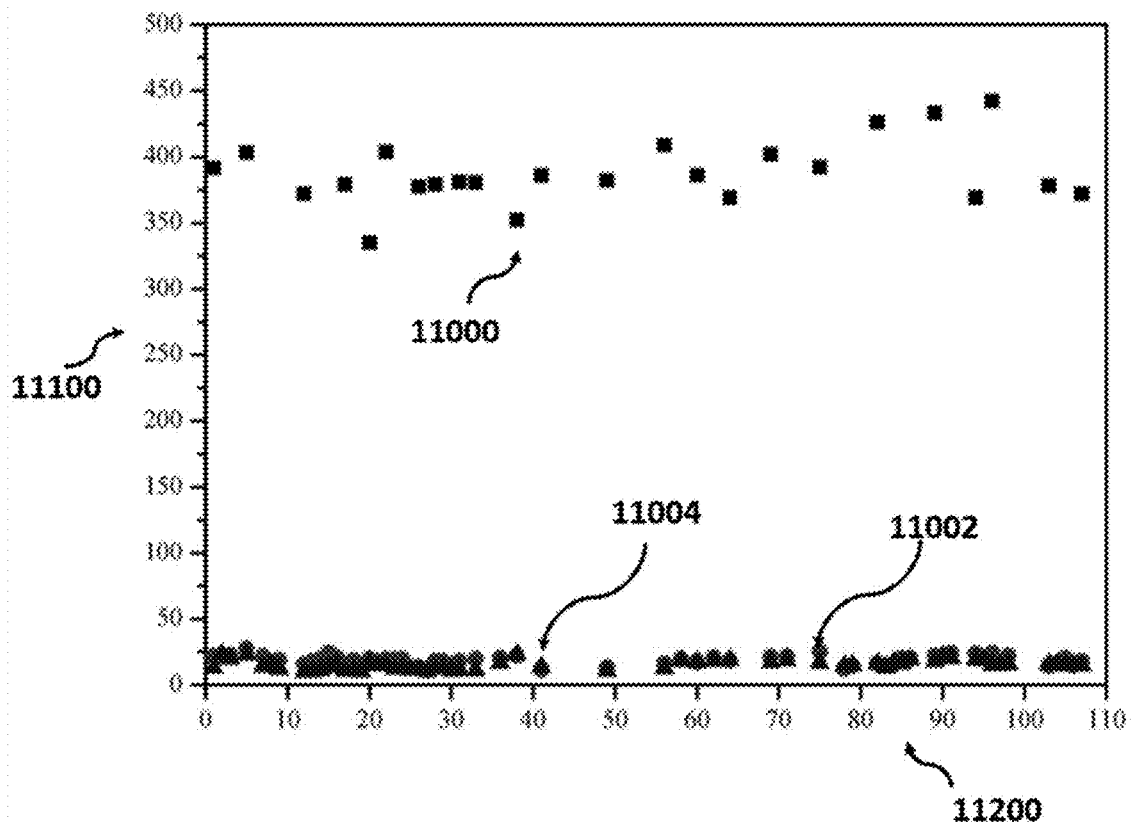
FIG. 11 shows examples of the COD profiles of the system and process of FIG. 9 during operation. The vertical axis 11100 denotes COD concentration (mg/L) and horizontal axis 11200 denotes time (day). 11000 denotes the influent COD, 11002 denotes UAFBR effluent COD, and 11004 denotes step-feed effluent COD.

As shown in FIG. 11, the influent COD concentration was significantly removed from 387 mg/L to about 19 mg/L in the UAFBR operated at an HRT of 6 hours, 78.8% of which was directly converted to methane with a methane yield of 0.29 L $CH_4$/g $COD_{removed}$ with 38% in the dissolved form. In addition, the observed sludge production in the UAFBR was found to be 0.05 g VSS/g COD on average, which was substantially lower than that of activated sludge with a typical value of 0.4-0.5 g VSS/g COD. These suggested that the present integrated process produced 89% less sludge compared to that in a conventional CAS process. The COD removal in the subsequent step-feed reactor was negligible, i.e. from 19 mg/L to 15 mg/L in the final effluent. The COD mass balance over the integrated process can be depicted by FIG. 3.

As most of influent COD in the wastewater was removed in the UAFBR, the COD/N ratio of about 0.44 was achieved in the feed to the step-feed reactor, which was favorable for anammox. It can be seen, as similarly illustrated in FIG. 4, that nearly half of the $NH_4^+$—N was oxidized to $NO_2^-$—N, but remained unremoved by anammox in the first several days. Thereafter, the $NH_4^+$—N and $NO_2^-$—N concentrations were gradually reduced and stabilized at about 3.2 mg N/L and 3.0 mg N/L in the effluent, respectively, while the averaged $NO_3^-$—N concentration was found to be less than 5 mg/L over the 110-day operation. Moreover, it appeared, as similarly shown in FIG. 5, that a significant nitrogen removal of 60% could be quickly achieved within 10 days, indicating a fast start-up of the mainstream deammonification in the step-feed reactor.

Example 6C

Integrated UAFBR and Step-Feed Reactor—Nitrogen Removal in the Step-Feed Reactor The nitrogen profiles in the step-feed reactor were closely monitored (FIG. 12), based on which the mass balance was constructed according to equations (2)-(4) described above. Mass balance over the step-feed reactor revealed that at steady-state 0.7 g $NH_4^+$—N/day was removed, corresponding to an ammonium removal rate of 96%, among which 51.6% was removed in the oxic chambers 304, while the remaining, i.e. 48.4%, was removed in the anoxic chambers 302. In oxic chambers, i.e. $O_1$, $O_2$, $O_3$ and $O_4$, the removed ammonium was mainly oxidized to nitrite at conversion ratios of 84.8%, 80.7%, 64.3% and 67.6%, respectively, while the nitrate produced in all oxic chambers only accounted for 5.16% to total ammonium removal in oxic chambers 304, indicating that excellent NOB repression was achieved in the step-feed reactor.

Figures 13, 14, 15:
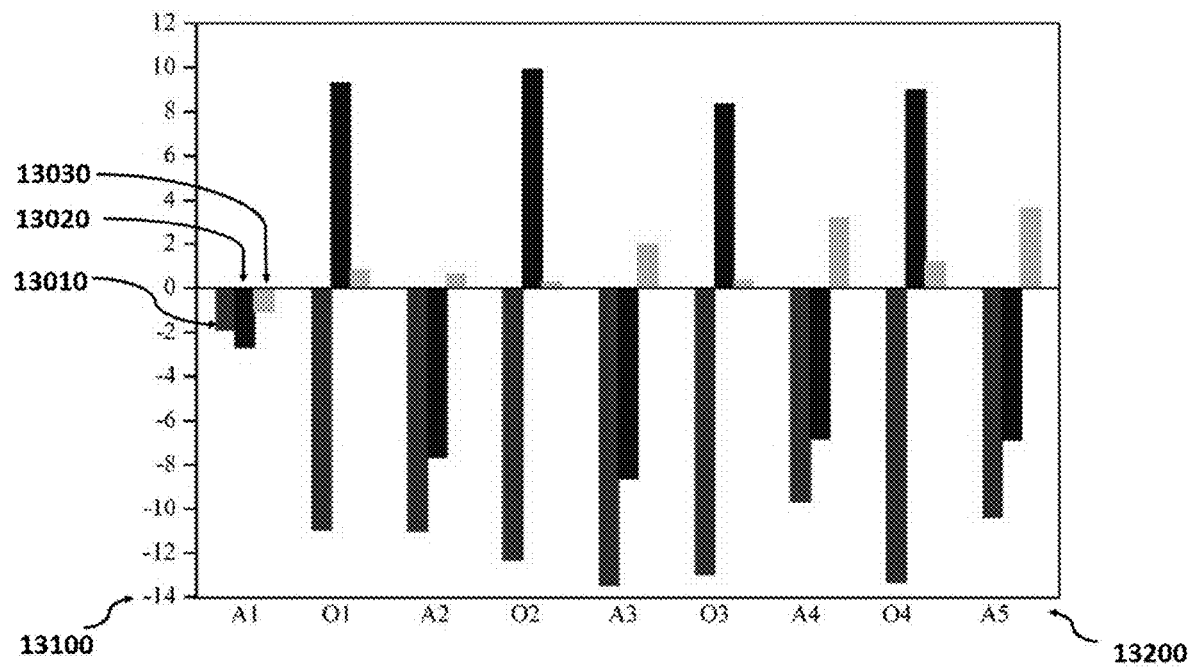
FIG. 13 shows examples of the conversion of nitrogen in the step-feed reactor of FIG. 9 (positive % values denotes production, negative % values denotes removal). The vertical axis 13100 denotes conversion of nitrogen species (%) and horizontal axis 13200 denotes the respective anoxic 302 and oxic 304 chambers. The leftmost bar in each set of three bars represented by 13010 denotes for $NH_4^+$ concentration. The middle bar in each set of three bars represented by 13020 denotes for the $NO_2^-$ concentration. The rightmost bar in each set of three bars represented by 13030 denotes for the $NO_3^-$ concentration.
FIG. 14 is a table showing the respective abundances of nitrogen removal-associated species in the step-feed reactor of FIG. 9.
FIG. 15 is a table showing the specific oxygen uptake rate (SOUR) analysis of the suspended sludge in the step-feed reactor of FIG. 9. $SOUR_H$: Specific oxygen uptake rate by heterotrophic bacteria.

As discussed above, nearly half of the removed ammonium was oxidized in oxic chambers 304 with high conversion ratio to nitrite. In step-feed reactor, the nitrite produced in oxic chambers 304 was carried over to the subsequent anoxic chamber 302 where anammox performed nitrogen removal with the presence of ammonium supplied by the step-feed. TN removal rate reached 0.59 g/day in the overall step-feed reactor, within which 87.1% of the TN removal occurred in anoxic chambers with clear simultaneous ammonium and nitrite concentration reduction and small amount of nitrate production (FIG. 13). With the sustainable supply of nitrite from the upstream oxic chamber, anoxic chambers, $A_2$ to $A_5$, achieved high TN removal, ranging from 16.4% to 24.8%, while anoxic chamber $A_1$ showed relatively low TN removal efficiency, i.e. 6.9%, probably due to the nitrite limitation caused by the returned flow with low nitrite concentration. It should be noted that the ratio of removed nitrite and ammonium was lower than reported stoichiometric ratio, e.g. 1.32, which was probably due to the limited nitritation with the residual dissolved oxygen carried over from upstream oxic chambers 304.

Example 6D

Figure 5:
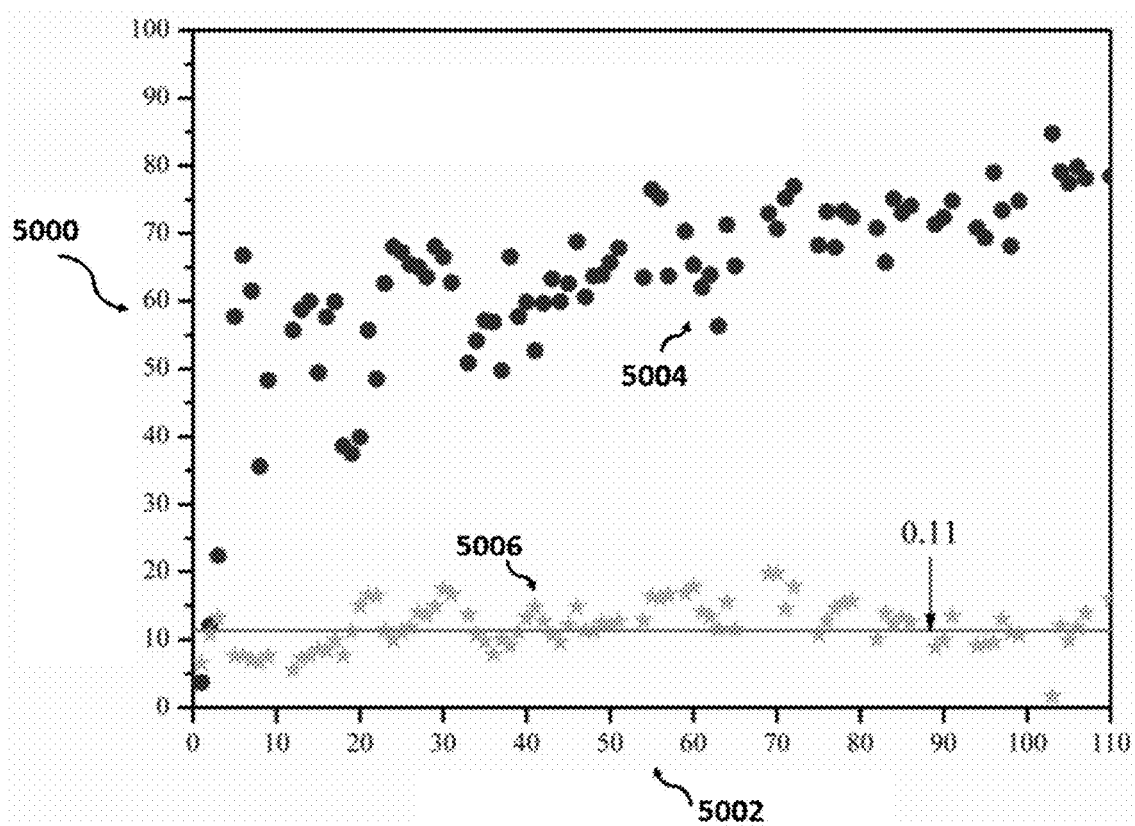
FIG. 5 shows an example of the total nitrogen (TN) removal efficiency and the ratio of $NO_3^-{}_{eff}/NH_4^+$—N removed through operation of the present system. The vertical axis 5000 denotes for TN removal efficiency (%) or ratio of $NO_3^-{}_{eff}/NH_4^+{}_{removed}$ (%) while horizontal axis 5002 denotes time (day). The plot denoted by 5004 belongs to TN removal efficiency and the plot denoted by 5006 belongs to the ratio of $NO_3^-{}_{eff}/NH_4^+$ removal.

Integrated UAFBR and Step-Feed Reactor—Repression Of NOB against AOB in the Step-Feed Reactor Effective NOB repression is advantageous for partial nitritation, which is in turn advantageous for sustainable anammox. However, stable partial nitritation still remains a big challenge in mainstream deammonification. So far, reportedly, the ratio of $NO_3^-$—$N_{eff}$/$NH_4^+$—$N_{removed}$ has been used as an indicator of the NOB repression. As can be seen in FIG. 5, the $NO_3^-$—$N_{eff}$/$NH_4^+$—$N_{removed}$ ratio obtained in this disclosure was very close to its theoretical value of 0.11, indicating that the NOB activity was effectively repressed in the step-feed reactor. Moreover, FIG. 14 further revealed that the gene copy number of AOB increased by more than 8 times from day 1 to the end of the operation. On the contrary, the gene copy number of *Nitrospira* remained at the same magnitude, while *Nitrobacter* experienced a clear declining. Meanwhile, the repressed NOB activity was also confirmed by the SOUR tests. It was found that the SOUR of AOB (i.e. 1.07±0.02 g $O_2$g VSS·day) was about 6 times higher than that of NOB (i.e. 0.17±0.07 g $O_2$/gVSS·day) (FIG. 15). These in turn demonstrated the successful NOB repression against AOB achieved in the step-feed reactor.

Figure 12:
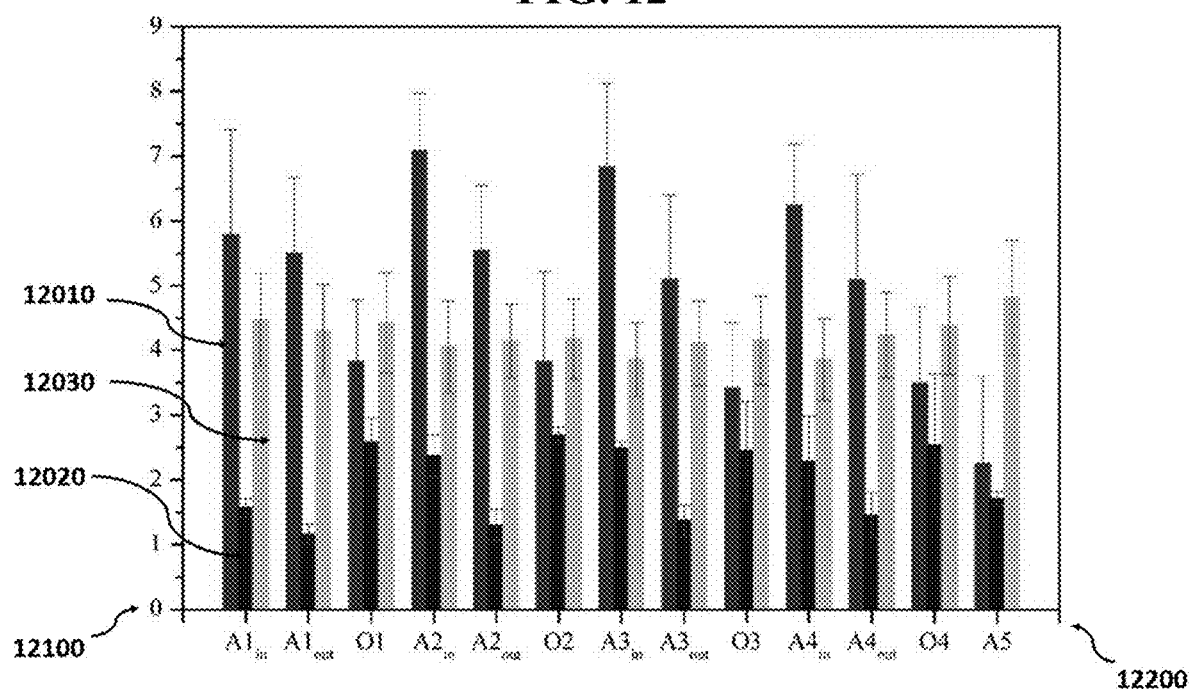
FIG. 12 shows examples of the nitrogen profiles in each anoxic chamber 302 and oxic chamber 304 of FIG. 9. The vertical axis 12100 denotes nitrogen concentration (mg/L) and horizontal axis 12200 denotes the specific anoxic 302 and oxic chambers 304 (e.g. A1 to A5 and O1 to O4, wherein A1 and O1 represent the most upstream anoxic 302 and oxic 304 chambers). The leftmost bar in each set of three bars represented by 12010 denotes for $NH_4^+$ concentration. The middle bar in each set of three bars represented by 12020 denotes for the $NO_2^+$ concentration. The rightmost bar in each set of three bars represented by 12030 denotes for the $NO_3^-$ concentration.

In the configuration of step-feed reactor, the suspended nitrifying sludge kept experiencing anoxic and oxic shift in spatial. The repression of NOB can be attributed to the anoxic disturbances in the step-feed reactor as described in FIG. 9. It appeared from the studies conducted in a step-feed SBR and MBBR that the duration of the anoxic phase in the range of 15 to 20 mins may be sufficient for repressing NOB activity. In some aspects of this disclosure, the anoxic HRTs in each chamber was controlled at 14 to 17 mins, favoring NOB activity repression. Moreover, substrate limitation (i.e. nitrite) at the beginning of the aerobic phase had been proved effective for NOB repression because the accumulation of nitrite might promote the activity of NOB in aerobic conditions. As shown in FIG. 12, the nitrite concentration was reduced to below 1.5 mg/L in the effluent from each anoxic chamber via anammox, which created a situation of nitrite limitation on NOB for the next oxic chamber. In addition, some other strategies had also been reported for NOB repression in mainstream deammonification, e.g. free ammonia (FA) and free nitrous acid (FNA). Another study aimed to achieve NOB repression through balancing the activities of AOB and anammox, which required the adjustment of the nitrogen loading rate (NLR) according to the actual specific anammox activity. This makes it difficult in real application. Compared with these reported approaches, the process configuration and operation strategy of the present disclosure were simpler and easy to control because the process stability does not rely on the sidestream for FA or FNA production, and efficient ammonia oxidation could be achieved in the oxic chambers with DO concentrations in the proposed range.

Example 6E

Integrated UAFBR and Step-Feed Reactor—Anammox Biofilms

As shown above, the stable NOB repression was successfully achieved, while a substantial anammox activity is advantageous for the long-term stability of the deammonification system 100 and process. In the step-feed reactor of FIG. 9, the average specific activity of anammox biofilm during the steady-state operation was determined to be 0.42 g N/(g VSS·day), which was about 4 times higher than that reported in a study at the same temperature. Anammox bacteria may not able to compete with heterotrophic denitrifiers on nitrite in situation where soluble COD is available. As such, the activity loss or even washout of anammox bacteria had been observed at high COD/N ratio. The present UAFBR effectively addresses such a challenge, as it is configured for COD capture and at the same time enhances methane production and reduces COD/N ratio for the subsequent mainstream deammonification. The low COD/N ratio of 0.44 achieved in this disclosure was favorable for anammox bacteria to outcompete with denitrifiers for nitrite. This in turn partially explained the high and stable specific anammox activity observed in the step-feed reactor.

Example 6F

Integrated UAFBR and Step-Feed Reactor—Comparative Example

Municipal wastewater treated by conventional CAS process has been receiving increasing critiques because of its low energy efficiency and generation of a huge amount of waste activated sludge (WAS). In this connection, to illustrate energy efficiency of the setup of FIG. 9, this was benchmarked against the CAS process employed in Ulu Pandan wastewater reclamation plant (WRP) in Singapore described above, except that UAFBR is specifically used in this instance as the anaerobic reactor 204. Nevertheless, similar results in Table 3 below may be obtained.

TABLE 3

Energy analysis of the A-B process of FIG. 9 as compared with CAS process in Ulu Pandan WRP

|  | Conventional CAS process | A-B process of FIG. 9 |
| --- | --- | --- |
| Total energy consumption (kWh/m$^3$) | −0.44 | −0.18 |
| Sludge treatment | −0.07 | −0.01 |
| Aeration | −0.23 | −0.03 |
| Others (e.g. pumping etc.) | −0.14 | −0.14[b] |
| Net recoverable energy (kWh/m$^3$) | 0.15 | 0.37 |
| Net energy gain (kWh/m$^3$) | −0.29 | 0.19 |

[b]denotes that the energy consumption under the category of others was assumed to be identical to the conventional CAS process.

Only 7% of the influent COD ended up in WAS against 44.9% in conventional CAS process, indicating that the production of WAS and its associated energy for treatment could be reduced by 84% in the present system 100 and process. In the present system 100 and process, the methane gas produced directly in the UAFBR accounted for 48.8% of the influent COD against 17.9% in conventional CAS process. The methane gas produced in the present system 100 and process may be at 311 g COD/m$^3$, equivalent to a total electrical energy of 0.37 kWh/m$^3$ (based on equation (1)) versus 0.15 kWh/m$^3$ in the Ulu Pandan WRP which adopts conventional CAS. Furthermore, the energy consumed by fine bubble aeration was 0.23 kWh/m$^3$, among which 0.14 kWh/m$^3$ was attributed to COD oxidation and 0.09 kWh/m$^3$ for complete nitrification. In contrast, the COD oxidation-associated energy could be totally saved in the present system 100 and process as the majority of the influent COD was captured for energy recovery in UAFBR. In addition, deammonification requires oxidizing only half of the influent ammonium to nitrite. Theoretically, 3.43 g O$_2$ is required for nitrifying 1 g NH$_4^+$—N to nitrite. As such, the energy consumption of aeration may be 0.03 kWh/m$^3$ with the assumption of fine bubble aeration system efficiency at 3 kg O$_2$/kWh. Consequently, net energy gain of 0.19 kWh/m$^3$ was calculated against the energy negative operation in conventional CAS. This disclosure demonstrated a feasible solution towards successful and stable mainstream deammonification with maximized energy recovery, reduced energy consumption and minimized sludge production.

Example 6G

Summary of Integrated UAFBR and Step-Feed Reactor

The examples of the present disclosure demonstrated the feasibility of achieving sustainable and stable mainstream deammonification in the integrated process for cost-effective ammonium removal. In the present system 100 and process, 48.8% of the influent COD was directly converted to methane gas in the UAFBR, while more than 80% of nitrogen was removed via mainstream deammonification in the step-feed reactor. The nitrogen conversion in each chamber showed that in oxic chambers 304 51.6% of the removed ammonium was oxidized to mainly nitrite, while 87.13% TN was removed in anoxic chambers 302. The SOUR and qPCR results clearly showed successful NOB repression throughout the whole operation period, indicating that the unique configuration of the step-feed reactor was favorable for NOB repression. Moreover, the anammox biofilms exhibited high specific anammox activity, thus sustainable and stable mainstream deammonification was achievable over more than 100 days of operation. Compared to municipal wastewater treatment with conventional CAS process, the present process generated 84% less excess sludge, with two-time more energy recovery. The integrated system 100 and process developed in this example may lead to the paradigm shift of the WWTP operation from energy-negative to energy self-sufficient.

Example 7

Commercial and Potential Applications

The present deammonification system 100 and process substantially improve the overall energy efficiency of wastewater treatment plants, wherein the present system and process operates based on the various aspects and embodiments described hereinabove. The various aspects and embodiments involve an A-B process, as already described above, operably feasible for wastewater reclamation and energy self-sufficient municipal wastewater treatment. The energy self-sufficiency arises from energy recovered in terms of the biogas, e.g. methane, which may serve as a fuel source for certain system and process operations of the present disclosure.

Rendering wastewater treatment plants self-sustainable in terms of energy demand is of significance, especially where global climate change is concerned. This happens to be one advantage of the present system and method, wherein sustainable high-efficiency anammox can be achieved in the A-B process for treating municipal wastewater. Moreover, the present system and process can be easily adopted. For example, the present system and process can be retrofitted into existing wastewater treatment facilities, thereby providing a more economically viable option for municipal wastewater treatment and a paradigm shift of a wastewater treatment plants' operation from being energy-negative (i.e. consumes a net amount of energy for operation of a treatment system) to neutral, and/or even positive.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A deammonification system for treating wastewater comprising:
   an anaerobic reactor operable to produce biogas from organic carbon in the wastewater;
   a degasser configured to receive wastewater from the anaerobic reactor, wherein the wastewater from the anaerobic reactor comprises the biogas dissolved therein, wherein the degasser is operable to recover the biogas dissolved in the wastewater from the anaerobic reactor; and
   a deammonification unit comprising (i) one or more anoxic chambers in fluid communication with the anaerobic reactor, wherein each of the one or more anoxic chambers houses a plurality of biocarriers, wherein each of the plurality of biocarriers comprises a biofilm of anaerobic ammonium oxidation bacteria, and (ii) one or more oxic chambers operable to produce nitrite from ammonia and/or ammonium, wherein the wastewater processed in an anoxic chamber of the one or more anoxic chambers is channeled to an oxic chamber of the one or more oxic chambers which is adjacent to and downstream of the anoxic chamber.

2. The deammonification system of claim 1, wherein the plurality of biocarriers housed in the one or more anoxic chambers occupy a volume of 30% to 50% thereof.

3. The deammonification system of claim 1, wherein the wastewater fed to the one or more anoxic chambers has a COD/N ratio of 1 or less.

4. The deammonification system of claim 1, wherein each of the one or more anoxic chambers and each of the one or more oxic chambers are configured to have a volume ratio ranging from 1:1 to 4:1.

5. The deammonification system of claim 1, wherein oxygen is supplied to all of the one or more oxic chambers for producing the nitrite from the ammonia and/or ammonium.

6. The deammonification system of claim 1, wherein the anaerobic reactor comprises an outlet to discharge the biogas produced in the anaerobic reactor.

7. The deammonification system of claim 1,
   wherein the degasser comprises a flash chamber, wherein the flash chamber is configurable to be in fluid communication with a buffer tank arranged downstream of the flash chamber but upstream of the one or more anoxic chambers; or
   wherein the degasser comprises a mixing chamber in fluid communication with one or more overflow weirs arranged in a cascading manner, wherein the wastewater is channeled from the mixing chamber to a cascade chamber of the degasser, wherein the cascade chamber is operable to strip the biogas dissolved in the wastewater from the anaerobic reactor, and wherein the wastewater from the cascade chamber is to be channeled to the one or more anoxic chambers.

8. The deammonification system of claim 1, wherein the biogas comprises methane.

9. The deammonification system of claim 1, further comprising a clarifier or a membrane filtration unit operable to separate sludge from the wastewater processed in the deammonification unit and to recycle the sludge to a most upstream anoxic chamber.

10. The deammonification system of claim 9, further comprising
    a reverse osmosis unit arranged in fluid communication and downstream of the membrane filtration unit, wherein (i) the membrane filtration unit and (ii) the reverse osmosis unit are operable to produce water; and/or
    an anaerobic digestion unit operable to:
       (a) receive sludge from:
          (i) the anaerobic reactor; and/or
          (ii) the clarifier or the membrane filtration unit; and
       (b) to produce biogas from the sludge.

11. The deammonification system of claim 9, wherein two or more anoxic chambers are present, and wherein the membrane filtration unit is integrated in a most downstream anoxic chamber.

12. A deammonification process for treating wastewater, comprising:
    introducing the wastewater to an anaerobic reactor operable to produce a biogas from organic carbon in the wastewater;
    feeding the wastewater from the anaerobic reactor to a degasser, wherein the wastewater from the anaerobic reactor comprises the biogas dissolved therein, wherein the degasser is operable to recover the biogas dissolved in the wastewater from the anaerobic reactor; and
    treating the wastewater from the anaerobic reactor in a deammonification unit, wherein the deammonification unit comprises (i) one or more anoxic chambers in fluid communication with the anaerobic reactor, wherein each of the one or more anoxic chambers houses a plurality of biocarriers, wherein each of the plurality of biocarriers comprises a biofilm of anaerobic ammonium oxidation bacteria, and (ii) one or more oxic chambers operable to produce nitrite from ammonia and/or ammonium, wherein the wastewater processed in an anoxic chamber of the one or more anoxic chambers is channeled to an oxic chamber of the one or more oxic chambers which is adjacent to and downstream of the anoxic chamber.

13. The deammonification process of claim 12, further comprising operating the anaerobic reactor to render the wastewater, which is fed to the one or more anoxic chambers, to have a COD/N ratio of 1 or less.

14. The deammonification process of claim 12,
    wherein feeding the wastewater from the anaerobic reactor to the degasser comprises agitating the wastewater from the anaerobic reactor in a flash chamber to recover the biogas dissolved in the wastewater from the anaerobic reactor; or
    wherein feeding the wastewater from the anaerobic reactor to the degasser comprises channeling the wastewater from the anaerobic reactor to a mixing chamber in fluid communication with one or more overflow weirs arranged in a cascading manner, wherein the wastewater is channeled from the mixing chamber to a cascade chamber of the degasser, wherein the cascade chamber is operable to strip the biogas dissolved in the wastewater from the anaerobic reactor, and wherein the wastewater from the cascade chamber is to be channeled to the one or more anoxic chambers.

15. The deammonification process of claim 12, wherein the biogas comprises methane.

16. The deammonification process of claim 12, wherein treating the wastewater in the deammonification unit comprises providing oxygen to all of the one or more oxic chambers to maintain dissolved oxygen therein at a concentration ranging from 0.3 mg $O_2$/L to 2 mg $O_2$/L.

17. The deammonification process of claim 12, further comprising:
   channeling the wastewater processed in the deammonification unit to a clarifier or a membrane filtration unit; and
   operating the clarifier or the membrane filtration unit to separate sludge from the wastewater processed in the deammonification unit and to recycle the sludge to a most upstream anoxic chamber at a rate ranging from 0.5 to 2.5 times of a flowrate of the wastewater introduced to the anaerobic reactor;
and/or
operating an anaerobic digestion unit to:
   (a) receive sludge from:
      (i) the anaerobic reactor; and/or
      (ii) the clarifier or the membrane filtration unit; and
   (b) to produce biogas from the sludge.

18. The deammonification process of claim 17, comprising
   operating (i) the membrane filtration unit to separate sludge from the wastewater processed in the deammonification unit and to recycle the sludge to the most upstream anoxic chamber at a rate ranging from 0.5 to 2.5 times of a flowrate of the wastewater introduced to the anaerobic reactor, and (ii) a reverse osmosis unit arranged in fluid communication and downstream of the membrane filtration unit, to produce water.

* * * * *

SEQUENCE LISTING

<160> NUMBER OF SEQ ID NOS: 11

<210> SEQ ID NO 1
<211> LENGTH: 19
<212> TYPE: DNA
<213> ORGANISM: Artificial Sequence
<220> FEATURE:
<223> OTHER INFORMATION: Primer sequence

<400> SEQUENCE: 1
ggagraaagc aggggatcg                                                19

<210> SEQ ID NO 2
<211> LENGTH: 19
<212> TYPE: DNA
<213> ORGANISM: Artificial Sequence
<220> FEATURE:
<223> OTHER INFORMATION: Primer sequence

<400> SEQUENCE: 2
ggaggaaagt aggggatcg                                                19

<210> SEQ ID NO 3
<211> LENGTH: 22
<212> TYPE: DNA
<213> ORGANISM: Artificial Sequence
<220> FEATURE:
<223> OTHER INFORMATION: Primer sequence

<400> SEQUENCE: 3
ctagcyttgt agtttcaaac gc                                            22

<210> SEQ ID NO 4
<211> LENGTH: 20
<212> TYPE: DNA
<213> ORGANISM: Artificial Sequence
<220> FEATURE:
<223> OTHER INFORMATION: Primer sequence

<400> SEQUENCE: 4
ctaaaactca aaggaattga                                               20

```
<210> SEQ ID NO 5
<211> LENGTH: 18
<212> TYPE: DNA
<213> ORGANISM: Artificial Sequence
<220> FEATURE:
<223> OTHER INFORMATION: Primer sequence

<400> SEQUENCE: 5 tttttttgaga tttgctag                                                    18

<210> SEQ ID NO 6
<211> LENGTH: 20
<212> TYPE: DNA
<213> ORGANISM: Artificial Sequence
<220> FEATURE:
<223> OTHER INFORMATION: Primer sequence

<400> SEQUENCE: 6
cctgctttca gttgctaccg                                                   20

<210> SEQ ID NO 7
<211> LENGTH: 20
<212> TYPE: DNA
<213> ORGANISM: Artificial Sequence
<220> FEATURE:
<223> OTHER INFORMATION: Primer sequence

<400> SEQUENCE: 7
gtttgcagcg ctttgtaccg                                                   20

<210> SEQ ID NO 8
<211> LENGTH: 17
<212> TYPE: DNA
<213> ORGANISM: Artificial Sequence
<220> FEATURE:
<223> OTHER INFORMATION: Primer sequence

<400> SEQUENCE: 8
cctacgggag gcagcag                                                      17

<210> SEQ ID NO 9
<211> LENGTH: 17
<212> TYPE: DNA
<213> ORGANISM: Artificial Sequence
<220> FEATURE:
<223> OTHER INFORMATION: Primer sequence

<400> SEQUENCE: 9
attaccgcgg ctgctgg                                                      17

<210> SEQ ID NO 10
<211> LENGTH: 18
<212> TYPE: DNA
<213> ORGANISM: Artificial Sequence
<220> FEATURE:
<223> OTHER INFORMATION: Primer sequence

<400> SEQUENCE: 10
gtcrggagtt adgaaatg                                                     18

<210> SEQ ID NO 11
<211> LENGTH: 18
<212> TYPE: DNA
<213> ORGANISM: Artificial Sequence
<220> FEATURE:
<223> OTHER INFORMATION: Primer sequence
```

```
<400> SEQUENCE: 11
accagaagtt ccactctc                                                18
```